United States Patent
Back et al.

(10) Patent No.: US 12,490,322 B2
(45) Date of Patent: Dec. 2, 2025

(54) OPERATION METHOD OF RELAY UE RELATED TO RELAY ESTABLISHMENT REQUEST IN WIRELESS COMMUNICATION SYSTEM

(71) Applicant: LG ELECTRONICS INC., Seoul (KR)

(72) Inventors: Seoyoung Back, Seoul (KR); Giwon Park, Seoul (KR); Jongyoul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 407 days.

(21) Appl. No.: 17/997,208

(22) PCT Filed: Apr. 28, 2021

(86) PCT No.: PCT/KR2021/005343
§ 371 (c)(1),
(2) Date: Oct. 26, 2022

(87) PCT Pub. No.: WO2021/221448
PCT Pub. Date: Nov. 4, 2021

(65) Prior Publication Data
US 2023/0199875 A1    Jun. 22, 2023

(30) Foreign Application Priority Data

Apr. 28, 2020 (KR) .................. 10-2020-0051161
May 12, 2020 (KR) .................. 10-2020-0056466

(51) Int. Cl.
*H04W 76/14* (2018.01)
*H04W 72/543* (2023.01)

(52) U.S. Cl.
CPC ......... *H04W 76/14* (2018.02); *H04W 72/543* (2023.01)

(58) Field of Classification Search
CPC ... H04W 76/14; H04W 72/543; H04W 24/10; H04W 76/18; H04W 88/04; H04W 92/18;
(Continued)

(56) References Cited

U.S. PATENT DOCUMENTS 9,832,678 B1 * 11/2017 Tandon ................. H04W 88/16
2009/0138596 A1 * 5/2009 Song ................... H04L 12/2821
709/225
(Continued)

FOREIGN PATENT DOCUMENTS

KR    10-2014-0058644    5/2014
KR    10-2017-0129917    11/2017

OTHER PUBLICATIONS

PCT International Application No. PCT/KR2021/005343, International Search Report dated Aug. 31, 2021, 3 pages.
(Continued)

*Primary Examiner* — Steven Hieu D Nguyen
(74) *Attorney, Agent, or Firm* — LEE, HONG, DEGERMAN, KANG & WAIMEY

(57) ABSTRACT

An embodiment provides an operation method of a relay UE related to a sidelink relay in a wireless communication system, the method comprising: receiving, by a relay UE, a relay request from a first remote UE; and determining, by the relay UE, whether to accept the relay request of the first remote UE, wherein the relay request includes first quality of service (QOS)-related information, and the relay UE accepts the relay request on the basis that resource allocation satisfying the first QoS-related information to the first remote UE is possible.

11 Claims, 21 Drawing Sheets

(58) Field of Classification Search
CPC ..... H04W 72/52; H04W 40/12; H04W 72/25; H04B 7/15542
See application file for complete search history.

(56) References Cited

U.S. PATENT DOCUMENTS

| | | | |
|---|---|---|---|
| 2012/0250509 A1* | 10/2012 | Leung | H04W 28/0252 370/235 |
| 2016/0100353 A1* | 4/2016 | Gleixner | H04M 15/81 370/329 |
| 2016/0338094 A1* | 11/2016 | Faurie | H04W 72/04 |
| 2017/0366958 A1* | 12/2017 | Ryu | H04W 88/04 |
| 2018/0255610 A1* | 9/2018 | Adachi | H04W 8/08 |
| 2019/0373647 A1 | 12/2019 | Rugeland et al. | |
| 2021/0289391 A1* | 9/2021 | Paladugu | H04W 88/04 |
| 2023/0053351 A1* | 2/2023 | Cheng | H04W 40/12 |

OTHER PUBLICATIONS

3rd Generation Partnership Project, "Technical Specification Group Services and System Aspects; Study on system enhancement for Proximity based Services (ProSe) in the 5G System (5GS) (Release 17)," 3GPP TR 23.752 V0.3.0, Jan. 2020, 75 pages.

3rd Generation Partnership Project, "Technical Specification Group Services and System Aspects; Architecture enhancements for 5G System (5GS) to support Vehicle-to-Everything (V2X) services (Release 16)," 3GPP TS 23.287 V16.2.0, Mar. 2020, 55 pages.

\* cited by examiner (a)

(b)

(a)

OPERATION METHOD OF RELAY UE RELATED TO RELAY ESTABLISHMENT REQUEST IN WIRELESS COMMUNICATION SYSTEM

CROSS-REFERENCE TO RELATED APPLICATION(S)

This application is the National Stage filing under 35 U.S.C. 371 of International Application No. PCT/KR2021/005343, filed on Apr. 28, 2021, which claims the benefit of earlier filing date and right of priority to Korean Application Nos. 10-2020-0051161, filed on Apr. 28, 2020, and 10-2020-0056466, filed on May 12, 2020, the contents of which are all hereby incorporated by reference herein in their entireties.

TECHNICAL FIELD

The present disclosure relates to a wireless communication system, and more particularly to a method and device for determining whether to accept a relay establishment request in consideration of a quality of service (QOS) of each of a remote user equipment (UE) and a conventional remote UE that have transmitted the relay establishment request.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G Finally, logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

SUMMARY

An object of the present disclosure is to provide a method for determining whether to accept a relay establishment request in consideration of a QoS of a remote UE that has transmitted the relay establishment request and a QoS of a conventional remote UE in a situation where the relay UE has received the relay establishment request of the remote UE.

In accordance with an aspect of the present disclosure, a method for operating a relay user equipment (UE) related to a sidelink relay in a wireless communication system may include receiving, by the relay UE, a relay request from a first remote user equipment (UE); and determining whether the relay UE accepts the relay request of the first remote UE, wherein the relay request includes information related to a first quality of service (QOS), and the relay UE accepts the relay request based on a situation in which resource allocation satisfying the first QoS-related information is applicable to the first remote UE.

In accordance with another aspect of the present disclosure, a relay user equipment (UE) for use in a wireless communication system may include at least one processor; and at least one computer memory operatively connected to the at least one processor, and configured to store instructions such that the at least one processor performs specific operations by executing the instructions, wherein the specific operations include: receiving a relay request from a first remote UE; and determining whether to accept the relay request of the first remote UE. The relay request includes first QoS-related information, and the relay UE accepts the relay request based on a situation in which resource allocation satisfying the first QoS-related information is applicable to the first remote UE.

In accordance with another aspect of the present disclosure, a processor configured to perform operations of a relay user equipment (UE) in a wireless communication system may include performing the operations: wherein the operations include: receiving a relay request from a first remote UE; and determining whether to accept the relay request of the first remote UE, wherein the relay request includes first QoS-related information, and the relay UE accepts the relay request based on a situation in which resource allocation satisfying the first QoS-related information is applicable to the first remote UE.

In accordance with another aspect of the present disclosure, a non-volatile computer-readable storage medium configured to store at least one computer program including instructions that, when executed by at least one processor, cause the at least one processor to perform specific operations for a user equipment (UE) may include performing the specific operations: wherein the specific operations include: receiving a relay request from a first remote UE; and determining whether to accept the relay request of the first remote UE, wherein the relay request includes first QoS-related information, and the relay UE accepts the relay request based on a situation in which resource allocation satisfying the first QoS-related information is applicable to the first remote UE.

The resource allocation may be based on a default pool allocated from a base station (BS).

The relay UE may reject the relay request based on a situation in which the first QoS-related information of the first remote UE is not satisfied.

The relay UE may reject the relay request based on failure to satisfy information related to a second QoS of a second remote UE in order to satisfy the first QoS-related information of the first remote UE.

The relay UE may transmit an additional resource allocation request to the base station (BS) based on failure to satisfy information related to a second QoS of a second remote UE in order to satisfy the first QoS-related information of the first remote UE.

The relay UE may defer acceptance of the relay request until additional resources are allocated after occurrence of the additional resource allocation request.

The relay UE may accept the relay request after occurrence of the additional resource allocation request.

The relay UE may perform dropping of the second remote UE not only based on failure to satisfy information related to a second QoS of a second remote UE in order to satisfy the first QoS-related information of the first remote UE, but also based on a situation in which the first remote UE has a higher priority than the second remote UE.

The first QoS-related information may be a PC5 5G QoS Identifier (PQI).

The default pool may be allocated for a relay operation regardless of a buffer status report (BSR) of the relay UE.

As is apparent from the above description, the method and device according to one embodiment of the present disclosure may establish a relay connection by considering a QoS in determining whether to accept a relay request, and may solve the problem in which a relay operation is abnormally performed due to QoS deterioration. In addition, the method and device according to the present disclosure can solve the QoS degradation problem of the remote UE that is already receiving a relay service due to addition of a relay connection.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

In various embodiments of the present disclosure, "/" and "," should be interpreted as "and/or". For example, "A/B" may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 1:
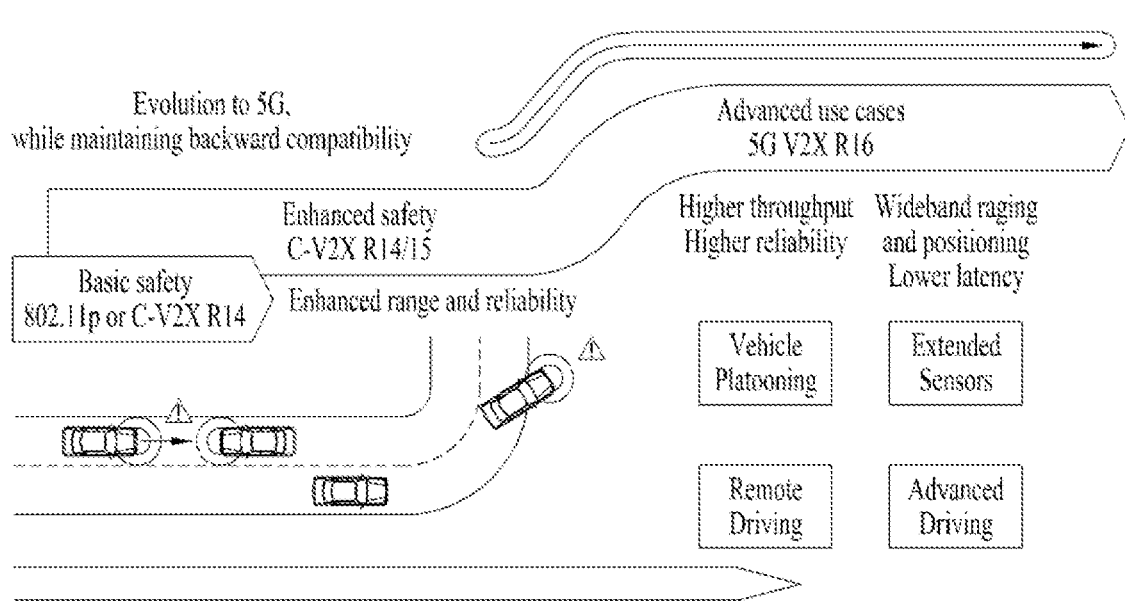
FIG. 1 is a diagram comparing vehicle-to-everything (V2X) communication based on pre-new radio access technology (pre-NR) with V2X communication based on NR.
Figure 2:
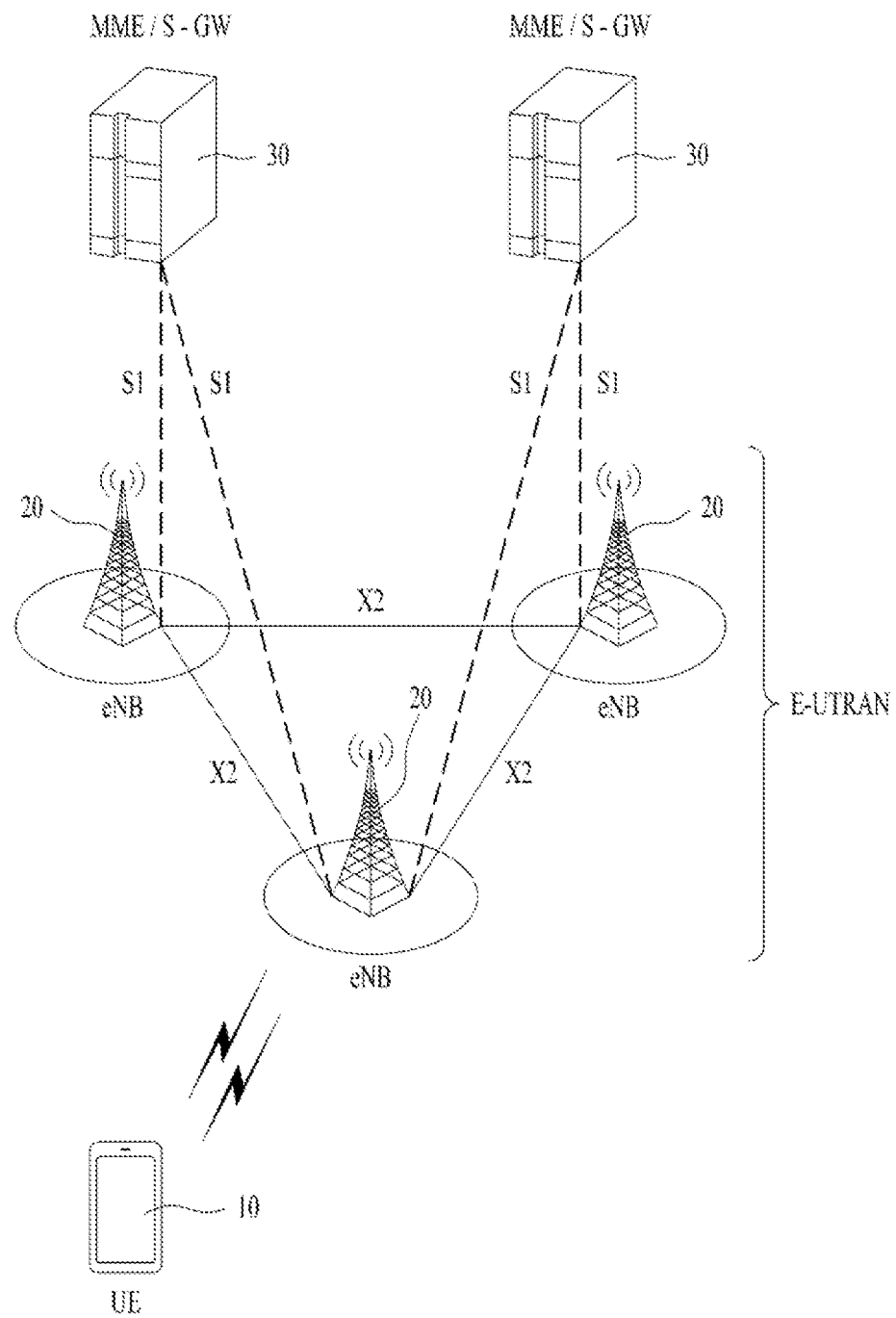
FIG. 2 is a diagram illustrating the structure of a long term evolution (LTE) system according to an embodiment of the present disclosure.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
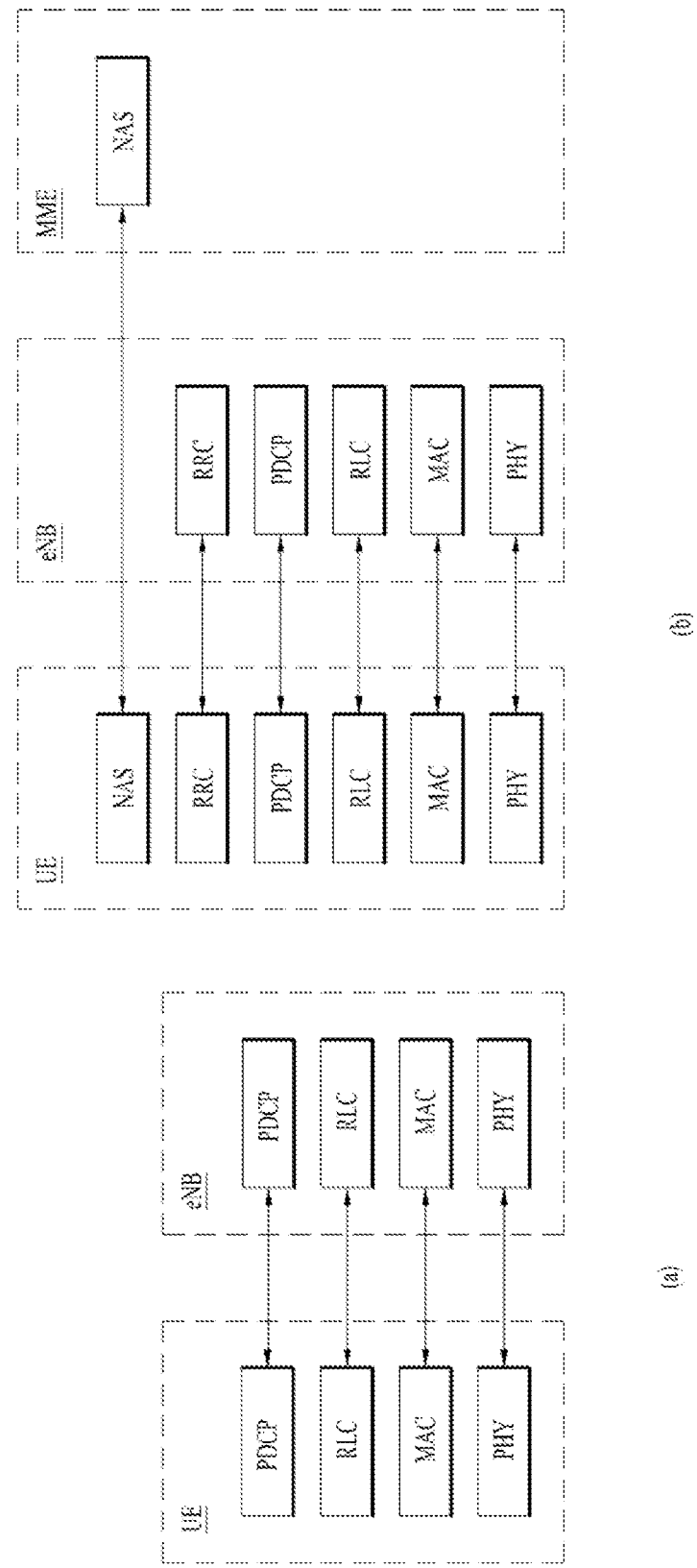
FIG. 3 is a diagram illustrating user-plane and control-plane radio protocol architectures according to an embodiment of the present disclosure.

FIG. 3(*a*) illustrates a user-plane radio protocol architecture according to an embodiment of the disclosure.

FIG. 3(*b*) illustrates a control-plane radio protocol architecture according to an embodiment of the disclosure. A user plane is a protocol stack for user data transmission, and a control plane is a protocol stack for control signal transmission.

Referring to FIGS. 3(*a*) and 3(*b*), the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QOS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbol in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 4:
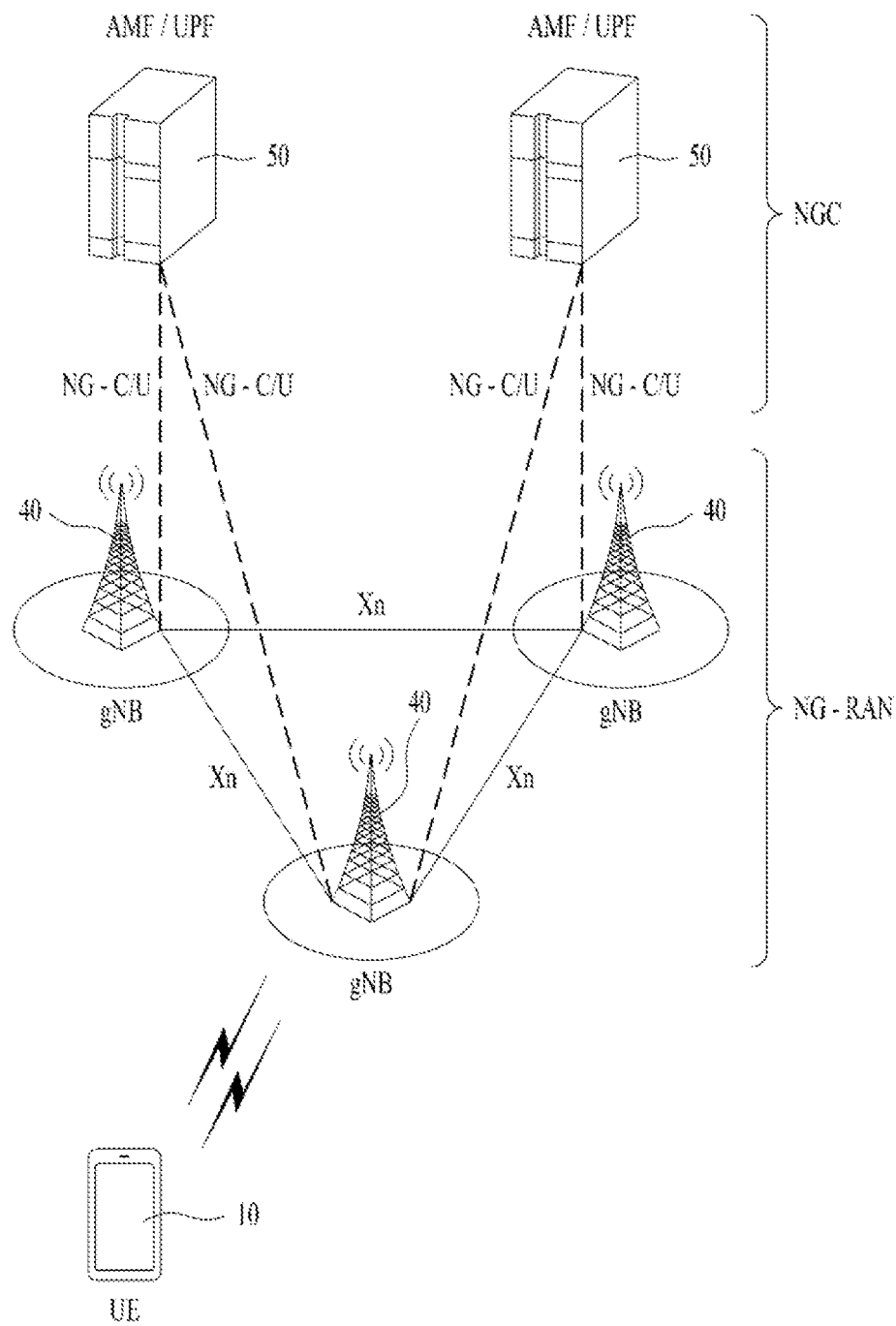
FIG. 4 is a diagram illustrating the structure of an NR system according to an embodiment of the present disclosure.

FIG. 4 illustrates the structure of an NR system according to an embodiment of the present disclosure.

Referring to FIG. 4, a next generation radio access network (NG-RAN) may include a next generation Node B (gNB) and/or an eNB, which provides user-plane and control-plane protocol termination to a UE. In FIG. 4, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 5:
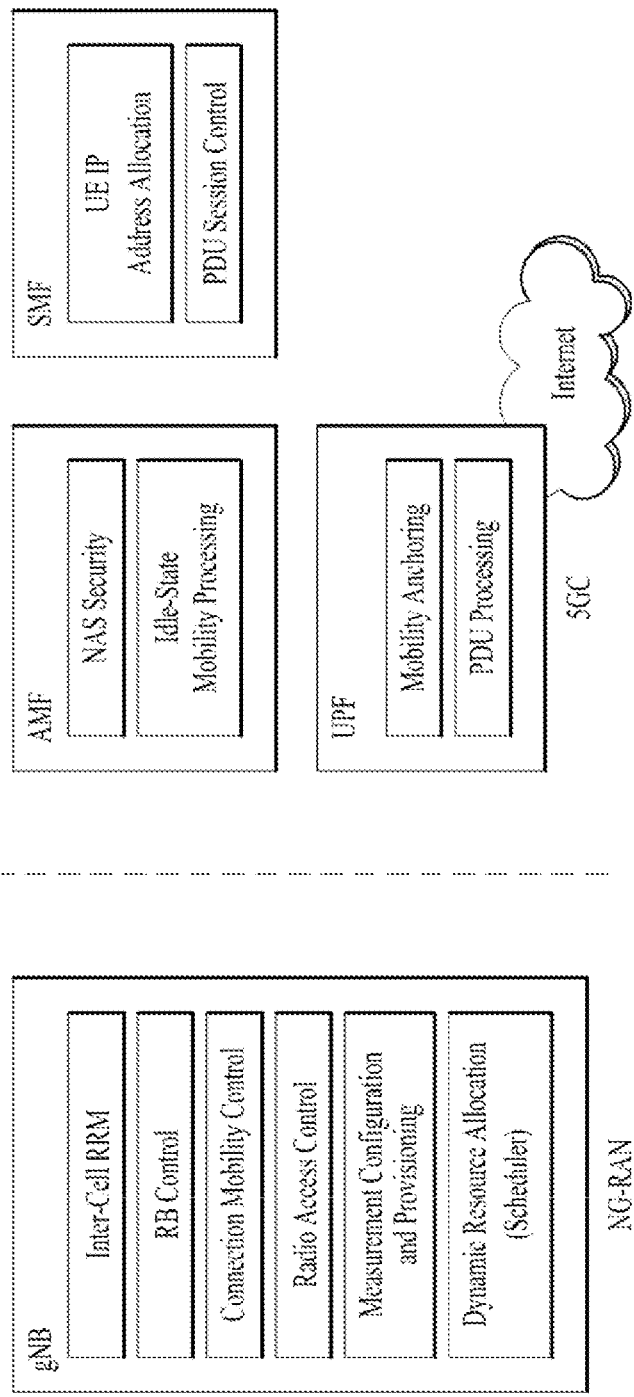
FIG. 5 is a diagram illustrating functional split between a next generation radio access network (NG-RAN) and a 5th generation core network (5GC) according to an embodiment of the present disclosure.

FIG. 5 illustrates functional split between the NG-RAN and the 5GC according to an embodiment of the present disclosure.

Referring to FIG. 5, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 6:
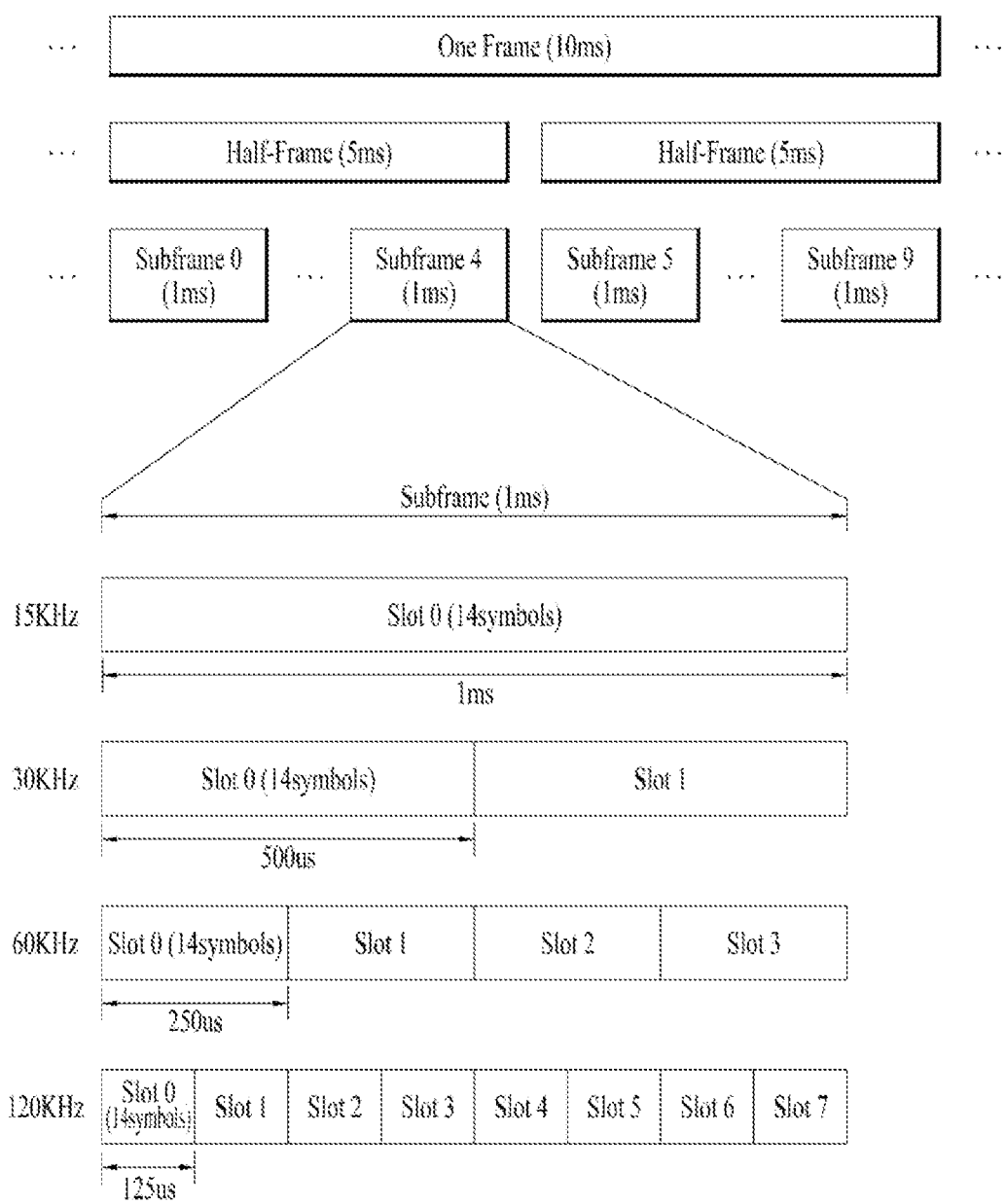
FIG. 6 is a diagram illustrating the structure of an NR radio frame to which embodiment(s) of the present disclosure is applicable.

FIG. 6 illustrates a radio frame structure in NR, to which embodiment(s) of the present disclosure is applicable.

Referring to FIG. 6, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

[Table 1] below lists the number of symbols per slot Nslotsymb, the number of slots per frame Nframe,uslot, and the number of slots per subframe Nsubframe,uslot according to an SCS configuration µ in the NCP case.

TABLE 1

| SCS (15*2^u) | $N_{symb}^{slot}$ | $N_{slot}^{frame,u}$ | $N_{slot}^{subframe,u}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

[Table 2] below lists the number of symbols per slot, the number of slots per frame, and the number of slots per subframe according to an SCS in the ECP case.

TABLE 2

| SCS (15*2^u) | $N_{symb}^{slot}$ | $N_{slot}^{frame,u}$ | $N_{slot}^{subframe,u}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells.

In NR, various numerologies or SCSs may be supported to support various 5G services. For example, with an SCS of 15 kHz, a wide area in traditional cellular bands may be supported, while with an SCS of 30 kHz/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in [Table 3]. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in [Table 4]. That is, FR1 may include a frequency band of 6 GHz (or 5850, 5900, and 5925 MHz) or above. For example, the frequency band of 6 GHZ (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 7:
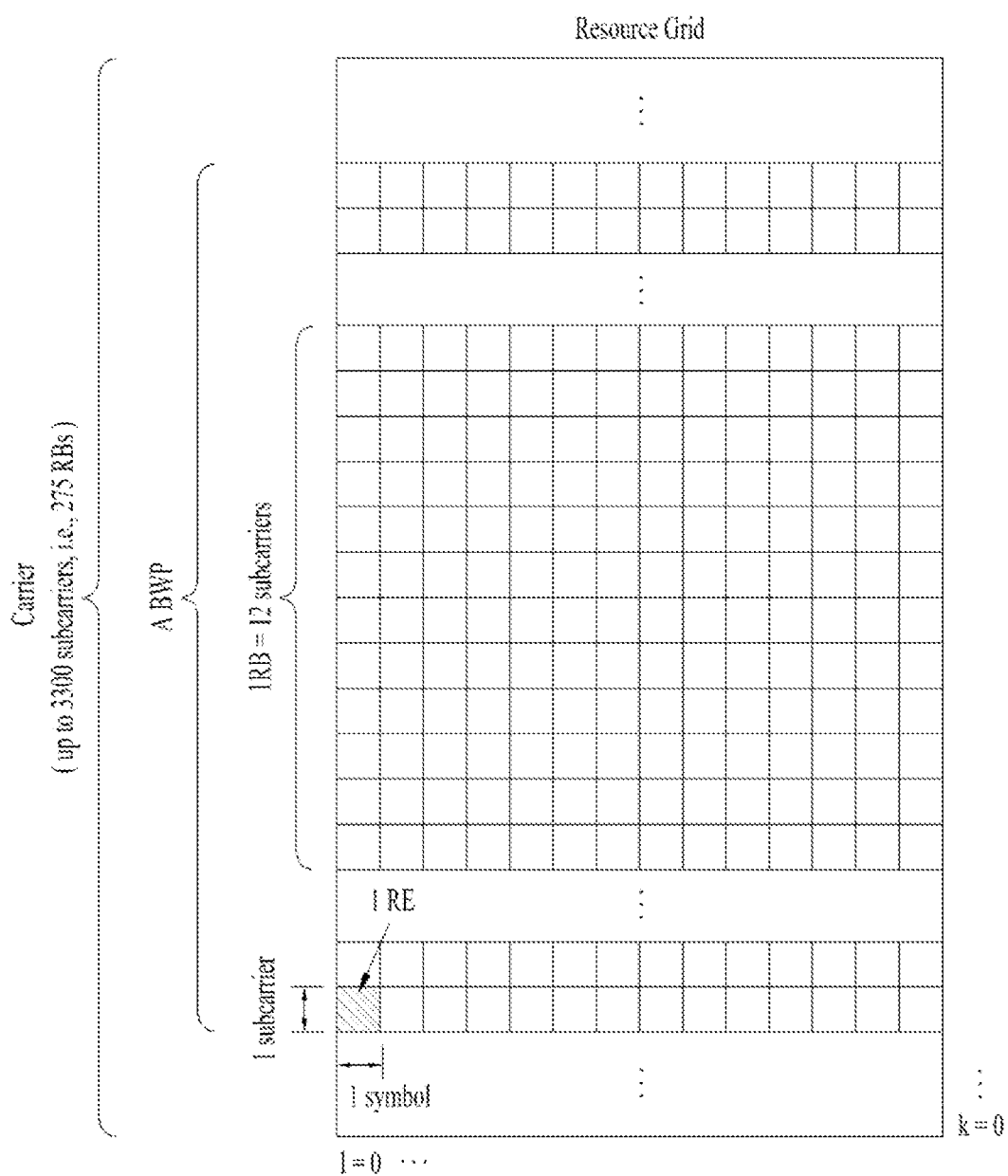
FIG. 7 is a diagram illustrating a slot structure of an NR frame according to an embodiment of the present disclosure.

FIG. 7 illustrates a slot structure in an NR frame according to an embodiment of the present disclosure.

Referring to FIG. 7, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Now, a description will be given of sidelink (SL) communication.

Figure 8:
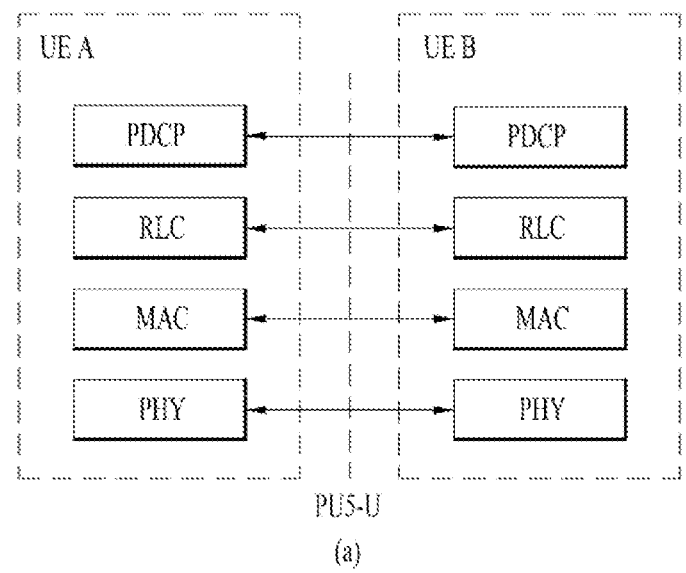
FIG. 8 is a diagram illustrating radio protocol architectures for sidelink (SL) communication according to an embodiment of the present disclosure.
Figure 8:
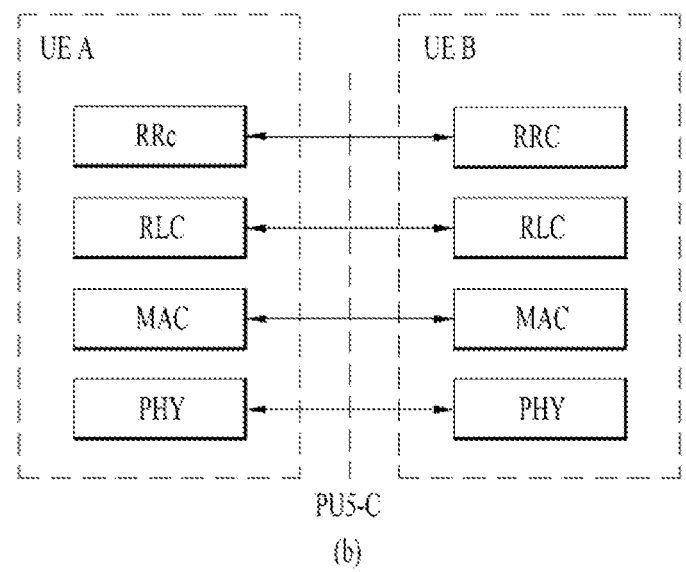

FIG. 8 illustrates a radio protocol architecture for SL communication according to an embodiment of the present disclosure. Specifically, FIG. 8(a) illustrates a user-plane protocol stack in LTE, and FIG. 8(b) illustrates a control-plane protocol stack in LTE.

Figure 9:
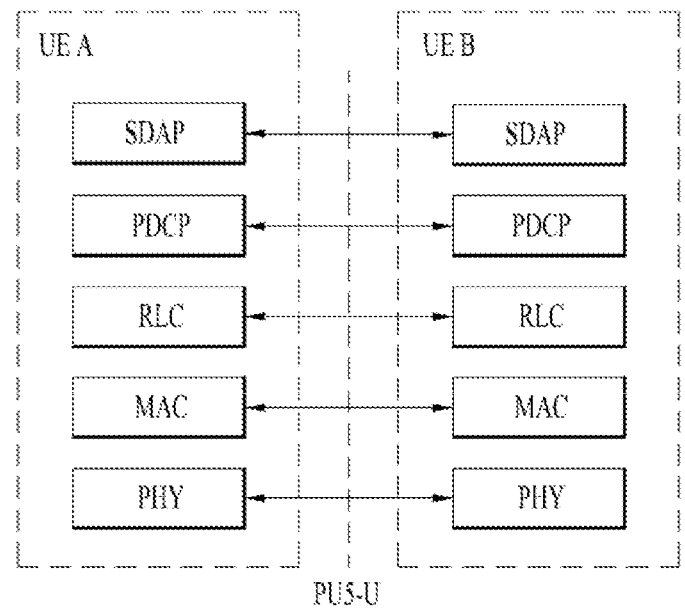
FIG. 9 is a diagram illustrating radio protocol architectures for SL communication according to an embodiment of the present disclosure.
Figure 9:
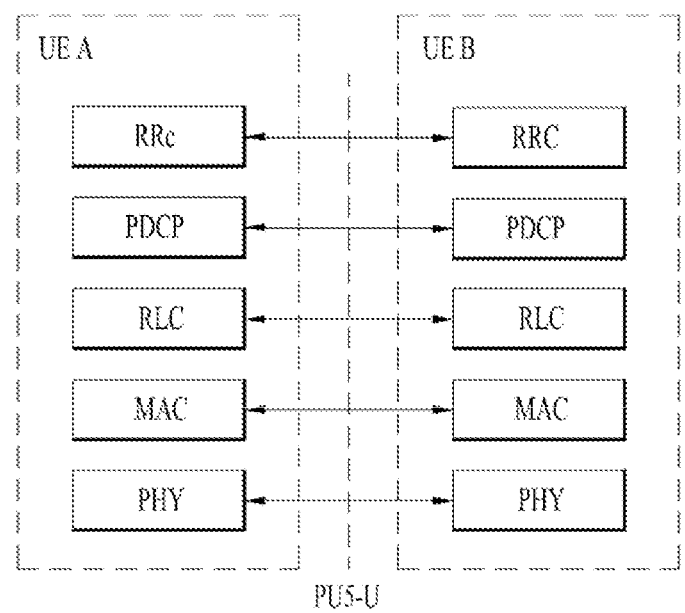

FIG. 9 illustrates a radio protocol architecture for SL communication according to an embodiment of the present disclosure. Specifically, FIG. 9(a) illustrates a user-plane protocol stack in NR, and FIG. 9(b) illustrates a control-plane protocol stack in NR.

Resource allocation in SL will be described below.

Figure 10:
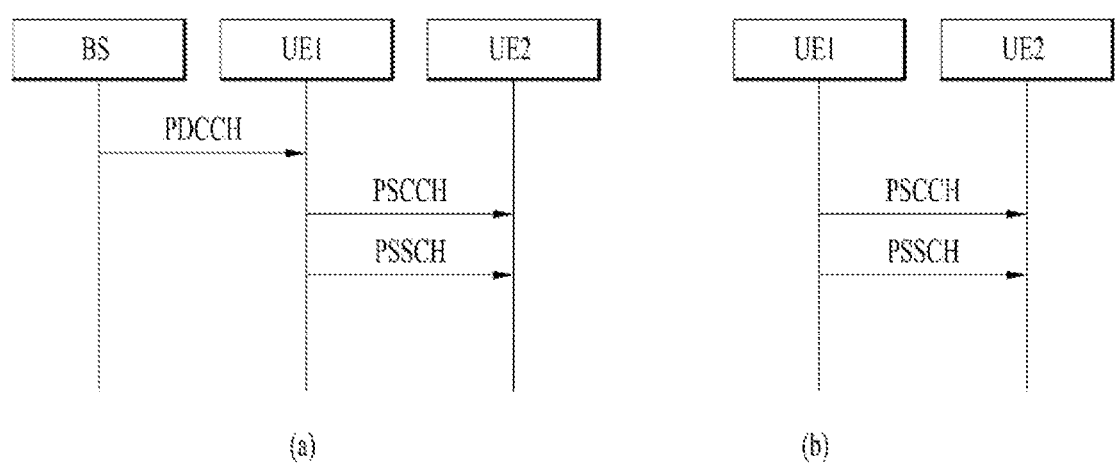
FIG. 10 illustrates a procedure in which a UE performs V2X or SL communication according to a transmission mode according to an embodiment of the present disclosure.

FIG. 10 illustrates a procedure of performing V2X or SL communication according to a transmission mode in a UE according to an embodiment of the present disclosure. In various embodiments of the present disclosure, a transmission mode may also be referred to as a mode or a resource allocation mode. For the convenience of description, a transmission mode in LTE may be referred to as an LTE transmission mode, and a transmission mode in NR may be referred to as an NR resource allocation mode.

For example, FIG. 10(a) illustrates a UE operation related to LTE transmission mode 1 or LTE transmission mode 3. Alternatively, for example, FIG. 10(a) illustrates a UE operation related to NR resource allocation mode 1. For example, LTE transmission mode 1 may be applied to general SL communication, and LTE transmission mode 3 may be applied to V2X communication.

For example, FIG. 10(b) illustrates a UE operation related to LTE transmission mode 2 or LTE transmission mode 4. Alternatively, for example, FIG. 10(b) illustrates a UE operation related to NR resource allocation mode 2.

Referring to FIG. 10(a), in LTE transmission mode 1, LTE transmission mode 3, or NR resource allocation mode 1, a BS may schedule SL resources to be used for SL transmission of a UE. For example, the BS may perform resource scheduling for UE1 through a PDCCH (more specifically, DL control information (DCI)), and UE1 may perform V2X or SL communication with UE2 according to the resource scheduling. For example, UE1 may transmit sidelink control information (SCI) to UE2 on a PSCCH, and then transmit data based on the SCI to UE2 on a PSSCH.

For example, in NR resource allocation mode 1, a UE may be provided with or allocated resources for one or more SL transmissions of one transport block (TB) by a dynamic grant from the BS. For example, the BS may provide the UE with resources for transmission of a PSCCH and/or a PSSCH by the dynamic grant. For example, a transmitting UE may report an SL hybrid automatic repeat request (SL HARQ) feedback received from a receiving UE to the BS. In this case, PUCCH resources and a timing for reporting the SL HARQ feedback to the BS may be determined based on an indication in a PDCCH, by which the BS allocates resources for SL transmission.

For example, the DCI may indicate a slot offset between the DCI reception and a first SL transmission scheduled by the DCI. For example, a minimum gap between the DCI that schedules the SL transmission resources and the resources of the first scheduled SL transmission may not be smaller than a processing time of the UE.

For example, in NR resource allocation mode 1, the UE may be periodically provided with or allocated a resource set for a plurality of SL transmissions through a configured grant from the BS. For example, the grant to be configured may include configured grant type 1 or configured grant type 2. For example, the UE may determine a TB to be transmitted in each occasion indicated by a given configured grant.

For example, the BS may allocate SL resources to the UE in the same carrier or different carriers.

For example, an NR gNB may control LTE-based SL communication. For example, the NR gNB may transmit NR DCI to the UE to schedule LTE SL resources. In this case, for example, a new RNTI may be defined to scramble the NR DCI. For example, the UE may include an NR SL module and an LTE SL module.

For example, after the UE including the NR SL module and the LTE SL module receives NR SL DCI from the gNB, the NR SL module may convert the NR SL DCI into LTE DCI type 5A, and transmit LTE DCI type 5A to the LTE SL module every Xms. For example, after the LTE SL module receives LTE DCI format 5A from the NR SL module, the LTE SL module may activate and/or release a first LTE subframe after Z ms. For example, X may be dynamically indicated by a field of the DCI. For example, a minimum value of X may be different according to a UE capability. For example, the UE may report a single value according to its UE capability. For example, X may be positive.

Referring to FIG. 10(b), in LTE transmission mode 2, LTE transmission mode 4, or NR resource allocation mode 2, the UE may determine SL transmission resources from among SL resources preconfigured or configured by the BS/network. For example, the preconfigured or configured SL resources may be a resource pool. For example, the UE may autonomously select or schedule SL transmission resources. For example, the UE may select resources in a configured resource pool on its own and perform SL communication in the selected resources. For example, the UE may select resources within a selection window on its own by a sensing and resource (re) selection procedure. For example, the sensing may be performed on a subchannel basis. UE1, which has autonomously selected resources in a resource pool, may transmit SCI to UE2 on a PSCCH and then transmit data based on the SCI to UE2 on a PSSCH.

For example, a UE may help another UE with SL resource selection. For example, in NR resource allocation mode 2, the UE may be configured with a grant configured for SL transmission. For example, in NR resource allocation mode 2, the UE may schedule SL transmission for another UE. For example, in NR resource allocation mode 2, the UE may reserve SL resources for blind retransmission.

For example, in NR resource allocation mode 2, UE1 may indicate the priority of SL transmission to UE2 by SCI. For example, UE2 may decode the SCI and perform sensing and/or resource (re) selection based on the priority. For example, the resource (re) selection procedure may include identifying candidate resources in a resource selection window by UE2 and selecting resources for (re) transmission from among the identified candidate resources by UE2. For example, the resource selection window may be a time interval during which the UE selects resources for SL transmission. For example, after UE2 triggers resource (re) selection, the resource selection window may start at T1≥0, and may be limited by the remaining packet delay budget of UE2. For example, when specific resources are indicated by the SCI received from UE1 by the second UE and an L1 SL reference signal received power (RSRP) measurement of the specific resources exceeds an SL RSRP threshold in the step of identifying candidate resources in the resource selection window by UE2, UE2 may not determine the specific resources as candidate resources. For example, the SL RSRP threshold may be determined based on the priority of SL transmission indicated by the SCI received from UE1 by UE2 and the priority of SL transmission in the resources selected by UE2.

For example, the L1 SL RSRP may be measured based on an SL demodulation reference signal (DMRS). For example, one or more PSSCH DMRS patterns may be configured or preconfigured in the time domain for each resource pool. For example, PDSCH DMRS configuration type 1 and/or type 2 may be identical or similar to a PSSCH DMRS pattern in the frequency domain. For example, an accurate DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, the transmitting UE may perform initial transmission of a TB without reservation based on the sensing and resource (re) selection procedure. For example, the transmitting UE may reserve SL resources for initial transmission of a second TB using SCI associated with a first TB based on the sensing and resource (re) selection procedure.

For example, in NR resource allocation mode 2, the UE may reserve resources for feedback-based PSSCH retransmission through signaling related to a previous transmission of the same TB. For example, the maximum number of SL resources reserved for one transmission, including a current transmission, may be 2, 3 or 4. For example, the maximum number of SL resources may be the same regardless of whether HARQ feedback is enabled. For example, the maximum number of HARQ (re) transmissions for one TB may be limited by a configuration or preconfiguration. For example, the maximum number of HARQ (re) transmissions may be up to 32. For example, if there is no configuration or preconfiguration, the maximum number of HARQ (re) transmissions may not be specified. For example, the configuration or preconfiguration may be for the transmitting UE. For example, in NR resource allocation mode 2, HARQ feedback for releasing resources which are not used by the UE may be supported.

For example, in NR resource allocation mode 2, the UE may indicate one or more subchannels and/or slots used by the UE to another UE by SCI. For example, the UE may indicate one or more subchannels and/or slots reserved for PSSCH (re) transmission by the UE to another UE by SCI. For example, a minimum allocation unit of SL resources may be a slot. For example, the size of a subchannel may be configured or preconfigured for the UE.

Sidelink control information (SCI) will be described below.

While control information transmitted from a BS to a UE on a PDCCH is referred to as DCI, control information transmitted from one UE to another UE on a PSCCH may be referred to as SCI. For example, the UE may know the starting symbol of the PSCCH and/or the number of symbols in the PSCCH before decoding the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) on the PSCCH and/or PSSCH to the receiving UE. The receiving UE may decode the two consecutive SCIs (e.g., 2-stage SCI) to receive the PSSCH from the transmitting UE. For example, when SCI configuration fields are divided into two groups in consideration of a (relatively) large SCI payload size, SCI including a first SCI configuration field group is referred to as first SCI. SCI including a second SCI configuration field group may be referred to as second SCI. For example, the transmitting UE may transmit the first SCI to the receiving UE on the PSCCH. For example, the transmitting UE may transmit the second SCI to the receiving UE on the PSCCH and/or PSSCH. For example, the second SCI may be transmitted to the receiving UE on an (independent) PSCCH or on a PSSCH in which the second SCI is piggybacked to data. For example, the two consecutive SCIs may be applied to different transmissions (e.g., unicast, broadcast, or groupcast).

For example, the transmitting UE may transmit all or part of the following information to the receiving UE by SCI. For example, the transmitting UE may transmit all or part of the following information to the receiving UE by first SCI and/or second SCI.

- PSSCH-related and/or PSCCH-related resource allocation information, for example, the positions/number of time/frequency resources, resource reservation information (e.g. a periodicity), and/or
- an SL channel state information (CSI) report request indicator or SL (L1) RSRP (and/or SL (L1) reference signal received quality (RSRQ) and/or SL (L1) received signal strength indicator (RSSI)) report request indicator, and/or
- an SL CSI transmission indicator (on PSSCH) (or SL (L1) RSRP (and/or SL (L1) RSRQ and/or SL (L1) RSSI) information transmission indicator), and/or
- MCS information, and/or
- transmission power information, and/or
- L1 destination ID information and/or L1 source ID information, and/or
- SL HARQ process ID information, and/or
- new data indicator (NDI) information, and/or
- redundancy version (RV) information, and/or
- QOS information (related to transmission traffic/packet), for example, priority information, and/or
- an SL CSI-RS transmission indicator or information about the number of SL CSI-RS antenna ports (to be transmitted);
- location information about a transmitting UE or location (or distance area) information about a target receiving UE (requested to transmit an SL HARQ feedback), and/or
- RS (e.g., DMRS or the like) information related to decoding and/or channel estimation of data transmitted on a PSSCH, for example, information related to a pattern of (time-frequency) mapping resources of the DMRS, rank information, and antenna port index information.

For example, the first SCI may include information related to channel sensing. For example, the receiving UE may decode the second SCI using the PSSCH DMRS. A polar code used for the PDCCH may be applied to the second SCI. For example, the payload size of the first SCI may be equal for unicast, groupcast and broadcast in a resource pool. After decoding the first SCI, the receiving UE does not need to perform blind decoding on the second SCI. For example, the first SCI may include scheduling information about the second SCI.

In various embodiments of the present disclosure, since the transmitting UE may transmit at least one of the SCI, the first SCI, or the second SCI to the receiving UE on the PSCCH, the PSCCH may be replaced with at least one of the SCI, the first SCI, or the second SC. Additionally or alternatively, for example, the SCI may be replaced with at least one of the PSCCH, the first SCI, or the second SCI. Additionally or alternatively, for example, since the transmitting UE may transmit the second SCI to the receiving UE on the PSSCH, the PSSCH may be replaced with the second SCI.

On the other hand, in the case of LTE-based PC5, QOS processing may be based on ProSe Per-Packet Priority (PPPP) and ProSe Per-Packet Reliability (PPPR), and a detailed description thereof refers to TS 23.285. For NR-based PC5, the QoS model similar to that defined in TS 23.501 is used for the Uu reference point (e.g., based on 5G QoS Identifier (5QI)). In case of V2X communication through the NR-based PC5 reference point, QoS flow may be associated with a PC5 QoS profile including QoS parameters defined in TS 23.287 v0.3.0 5.4.2. The UE may be configured with a default PC5 QoS profile set for use in V2X services as defined in TS 23.287 v0.3.0 5.1.2.1. For NR-based unicast, groupcast and broadcast PC5 communication, the QoS model for each flow for PC5 QoS management should be used.

The following principle may be applied to the case in which V2X communication is transferred through the PC5 reference point. The application layer may configure QoS requirements for V2X communication using the PPPP and PPPR models or PQI and range models defined in TS 23.285. Depending on the type of PC5 reference points selected for transmission (i.e., according to LTE-based or NR-based types), the UE may map the QoS requirements provided from the application layer to appropriate QoS parameters to be transferred to a lower layer. The mapping between two QoS models has been defined in TS 23.287 v0.3.0 5.4.2.

When using the groupcast or unicast mode of V2X communication through NR-based PC5, the range parameter is related to QoS parameters of V2X communication. Here, this range may use default values that were provided from the V2X application layer or were mapped in the service types according to the configuration defined in TS 23.287 0.3.0 5.1.2.1. In this case, the term "range" may indicate a minimum distance that must satisfy QoS parameters. The range parameter may be transferred to the AS layer together with QoS parameters for dynamic control.

NR-based PC5 may support three types of communication modes such as broadcast, groupcast and unicast. QoS processing of these different modes has been described in TS 23.287 v0.3.0 5.4.1.2 to TS 23.287 v0.3.0 5.4.1.4. The UE may process broadcast, groupcast, and unicast traffic in consideration of all priorities, each of which can be denoted as PQI. In the case of the broadcast and groupcast modes of V2X communication through NR-based PC5, since there is no signaling through the PC5 reference point, the standardized PQI values can be applied by the UE. When the mode of operation scheduled by the network is used, the UE-PC5-AMBR for NR-based PC5 is applied to all types of communication modes, and is used by the NG-RAN to perform capping of NR-based PC5 transmission of the UE in resource management.

Hereinafter, the PC5 QoS parameters will be described in detail.

1) PQI

PQI is a special 5QI defined in 5.7.2.1 of TS 23.501, and is used as a reference for the PC5 QoS characteristics defined in TS 23.287 v0.3.0 5.4.3, that is, a reference for parameters that control QoS transmission processing for packets through the PC5 reference point. The standardized PQI values are mapped one-to-one to standardized combinations of PC5 QOS characteristics specified in Table 2.

2) PC5 Flow Bit Rates

There are the following additional PC5 QoS parameters only in the GBR QoS flow.

- Guaranteed Flow Bit Rate (GFBR);
- Maximum Flow Bit Rate (MFBR).

GFBR and MFBR, which are defined in 5.7.2.5 of TS 23.501, are used to control bit rates of the PC5 reference point through an average time window. For PC5 communication, the same GFBR and MFBR are used bi-directionally.

3) PC5 Link Aggregated Bit Rates

PC5 unicast links may be associated with an aggregate rate limit QoS parameter called a total maximum bit rate for each link (PC5 LINK-AMBR). PC5 LINK-AMBR may limit the aggregate bit rate expected to be provided for all non-GBR QoS flows along with (peer) UEs over PC5 unicast links. The PC5 LINK-AMBR may be measured in the AMBR averaging window, which is a standardized value. PC5 LINK-AMBR is not applied to GBR QOS flow.

4) Range

5) Default Values

For example, the UE may be configured to use default values for PC5 QoS parameters for a specific service identified by a Provider Service Identifier (PSID)/ITS Application Identifier (ITS-AID). Default values are used in a situation where the corresponding PC5 QoS parameters are not provided by higher layers.

Hereinafter, PC5 QoS characteristics will be described in detail.

Standardized or pre-configured PC5 QOS characteristics are indicated via PQI values. Upper layers may indicate specific PC5 QoS characteristics along with PQI so as to ignore the standardized or preconfigured values.

1) Resource Type

2) Priority Level

The priority level has the same format and meaning as PPPP (ProSe Per-Packet Priority) defined in TS 23.285. The priority level is used to process V2X service data differently in different communication modes such as broadcast, groupcast, and unicast. When all QoS requirements cannot be fulfilled for all PC5 service data, the priority level may be used to select PC5 service data in a manner that the PC5 service data having a priority level value of N has a higher priority than the other PC5 service data having a higher priority level value such as N+1, N+2, etc. (That is, the lower the level value, the higher the priority).

3) Packet Delay Budget

Packet Delay Budget (PDB) has been defined in 5.7.3.4 of TS 23.501. However, when used for PC5 communication, the PDB associated with the PQI does not include a CN delay component.

4) Packet Error Rate

5) Averaging Window

6) Maximum Data Burst Volume

Maximum Data Burst Volume (MDBV) may represent the maximum amount of data required for the PCQ reference point scheduled to be serviced within a PDB period of the PQI.

Table 5 shows the result of standardized PQI to QoS characteristics mapping.

TABLE 5

| PQI Value | Resource Type | Default Priority Level | Packet Delay Budget | Packet Error Rate | Default Maximum Data Burst Volume | Default Averaging Window | Example Services |
|---|---|---|---|---|---|---|---|
| 1 | GBR | 3 | 20 ms | $10^{-4}$ | N/A | 2000 ms | Platooning between UEs-Higher degree of automation; Platooning between UE and RSU-Higher degree of automation |
| 2 | (NOTE 1) | 4 | 50 ms | $10^{-2}$ | N/A | 2000 ms | Sensor sharing- higher degree of automation |
| 3 | | 3 | 100 ms | $10^{-4}$ | N/A | 2000 ms | Information sharing for automated driving- between UEs or UE and RSU-higher degree of automation |
| 55 | Non-GBR | 3 | 10 ms | $10^{-4}$ | N/A | N/A | Cooperative lane change-higher degree of automation |
| 56 | | 6 | 20 ms | $10^{-1}$ | N/A | N/A | Platooning informative exchange-low degree of automation; Platooning- information sharing with RSU |
| 57 | | 5 | 25 ms | $10^{-1}$ | N/A | N/A | Cooperative lane change-lower degree of automation |
| 58 | | 4 | 100 ms | $10^{-2}$ | N/A | N/A | Sensor information sharing-lower degree of automation |
| 59 | | 6 | 500 ms | $10^{-1}$ | N/A | N/A | Platooning-reporting to an RSU |
| 82 | Delay Critical GBR | 3 | 10 ms | $10^{-4}$ | 2000 bytes | 2000 ms | Cooperative collision avoidance; Sensor sharing- Higher degree of automation; Video sharing-higher degree of automation |

TABLE 5-continued

| PQI Value | Resource Type | Default Priority Level | Packet Delay Budget | Packet Error Rate | Default Maximum Data Burst Volume | Default Averaging Window | Example Services |
|---|---|---|---|---|---|---|---|
| 83 | (NOTE 1) | 2 | 3 ms | $10^{-5}$ | 2000 bytes | 2000 ms | Emergency trajectory alignment; Sensor sharing- Higher degree of automation |

Meanwhile, the UE-to-Network Relay operation may include operation of the base station (BS), operation of a relay UE, and operation of a remote UE(s). It is assumed/ premised that the relay UE and the BS are connected to each other via the Uu link, and the remote UE and the relay UE are connected to each other via sidelink. In addition, although the remote UE may be present inside or outside of the BS coverage, it is assumed/premised that the remote UE transmits/receives most data to/from the BS through the relay UE while operating in the remote UE mode.

As a resource allocation method for the relay UE, when the BS allocates a certain amount of resources to the relay UE as resources for the relay operation, there may be a method for coordinating resources for sidelink communication between the relay UE and the remote UE to the other remote UE connected to the relay UE within relay resources in which the relay UE is allowed.

If it is assumed that the relay UE coordinates resources for the remote UE within the resources allowed by the BS, the policy capable of determining whether to allow a connection with a new remote UE may be required. That is, when a new remote UE requests a relay connection from the relay UE, a method for determining whether the relay UE accepts this request may be necessary, and the admission control method of the relay UE for the principle has not yet been concretized. That is, there is no specific content as to whether the relay UE accepts the connection with the remote UE. The following embodiment(s) of the present disclosure provide the criteria and procedure for determining whether the relay UE accepts the new remote UE.

Figure 11:
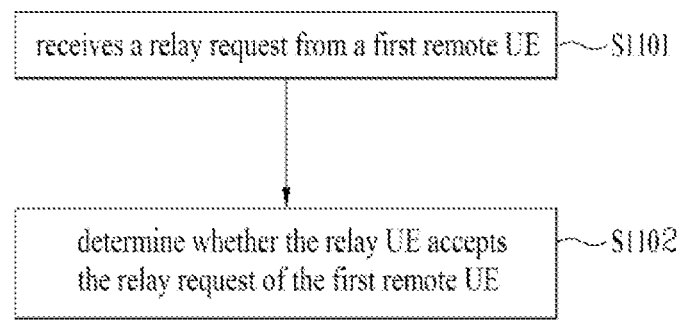
FIGS. 11 to 14 are diagrams illustrating the embodiment(s).

The relay UE according to one embodiment may receive a relay request from a first remote UE (S1101 in FIG. 11), and may determine whether to accept the relay request of the first remote UE (S1102 in FIG. 11). In this case, the relay request may include first QoS-related information, and the relay UE may accept the relay request based on the situation in which resources satisfying the first QoS-related information can be allocated to the first remote UE.

That is, when the relay UE establishes a connection with a new remote UE that has requested PC5-S link/relay request/path establishment for the relay operation within the resource pool for the relay, the relay UE may perform estimation for determining whether the resource to be allocated to the new remote UE is considered sufficient within the current resource pool (or resource pool). In addition, if the resource estimation result indicates that resources capable of satisfying the QoS profile of the new remote UE within the relay resources (or the resource pool) allocated from the current BS can be allocated, the relay UE may transmit a relay response message to the new remote UE, or may perform the relay path establishment process with the new remote UE. In this case, it is possible to solve the QoS problem that may be caused by the conventional relay UE indiscriminately accepting the relay request.

The first QoS-related information may be the PC5 5G QOS Identifier (PQI/5QI). In this regard, the remote UE may allow the relay request/path establishment message for a relay connection to include either the QoS profile (e.g., PQI) of data (or data expected to be received through the relay) to be transmitted through the relay or the service type (assuming that a throughput, latency, priority, PQI, QFI, etc. of data to be transmitted can be estimated), so that the resultant relay request/path establishment message can be transmitted to a destination.

In relation to determining whether to accept the relay request, the relay UE may reject the relay request based on failure in which the first QoS-related information of the first remote UE is not satisfied. That is, if the resource estimation result indicates that a resource satisfying the QoS profile of the new remote UE cannot be allocated within the relay resource (or the resource pool) allocated from the current BS, the relay UE may inform the new remote UE of a situation where the QoS profile will not be satisfied, and at the same time may declare rejection of the relay request/path establishment.

Subsequently, various embodiments related to determination as to whether to accept the above relay request will be described in detail. The following embodiments may be used together with the above examples only if they do not conflict with the above-described relay request acceptance-related embodiments. In the following description, it is assumed that each remote UE connected to the relay UE has upper/lower limit ranges of a desired QoS and can provide a high-quality QoS within the limit in which resources are allowed. In contrast, if resources are not allowed, it is assumed that the operation implemented when only the minimum QoS is satisfied is made available. In this case, when estimating resources for a new remote UE, the QoS quality of the conventional remote UE may be adjusted to satisfy only minimum QoS. Alternatively, the minimum QoS may be satisfied only for a remote UE that transmits data having a lower priority than the new remote UE.

For example, the relay UE may reject the relay request based on failure to satisfy the second QoS-related information of the second remote UE in order to satisfy the first QoS-related information of the first remote UE. That is, when the resource estimation result indicates that a (minimum) QoS of another remote UE with which the current connection is made is not satisfied, it is informed that resources to be allocated to the new remote UE are insufficient, and relay request/path establishment reject may be declared.

Alternatively, the relay UE may request additional resource allocation from the BS based on failure to satisfy the second QoS-related information of the second remote UE in order to satisfy the first QoS-related information of the first remote UE. The relay UE may defer acceptance of the relay request until the additional resources are allocated after occurrence of the additional resource allocation request. Alternatively, the relay UE may accept the relay request after occurrence of the additional resource allocation request. In other words, if the resource estimation result indicates that a (minimum) QoS of another remote UE with which the current connection is made is not satisfied, the relay UE may request additional resource allocation from the gNB. If additional resources for the relay in the gNB are supported for the relay UE, connection complete (admission) may be declared. Otherwise, relay request/path establishment reject may be declared. To this end, the relay UE may delay (or defer) connection complete (admission) declaration until additional resources for the relay are supported/allocated in the gNB. Alternatively, the relay UE may declare connection complete (admission) while requesting additional resource allocation from the gNB.

As another example, the relay UE may not satisfy the second QoS-related information of the second remote UE in order to satisfy the first QoS-related information of the first remote UE, and the second remote UE may be dropped based on the situation where the first remote UE has a higher priority than the second remote UE. That is, if the resource estimation result indicates that (sidelink of) another remote UE that is currently in a connection state does not satisfy the minimum QoS, (sidelink with) a remote UE having a lower priority than a remote UE that has requested a new connection during operation of the currently-connected remote UE (or during operation of sidelink with the currently-connected remote UE) may be dropped based on priority information, and connection complete (admission) for a new remote UE (or for sidelink with a new remote UE) may be declared based on priority information.

Figure 12:
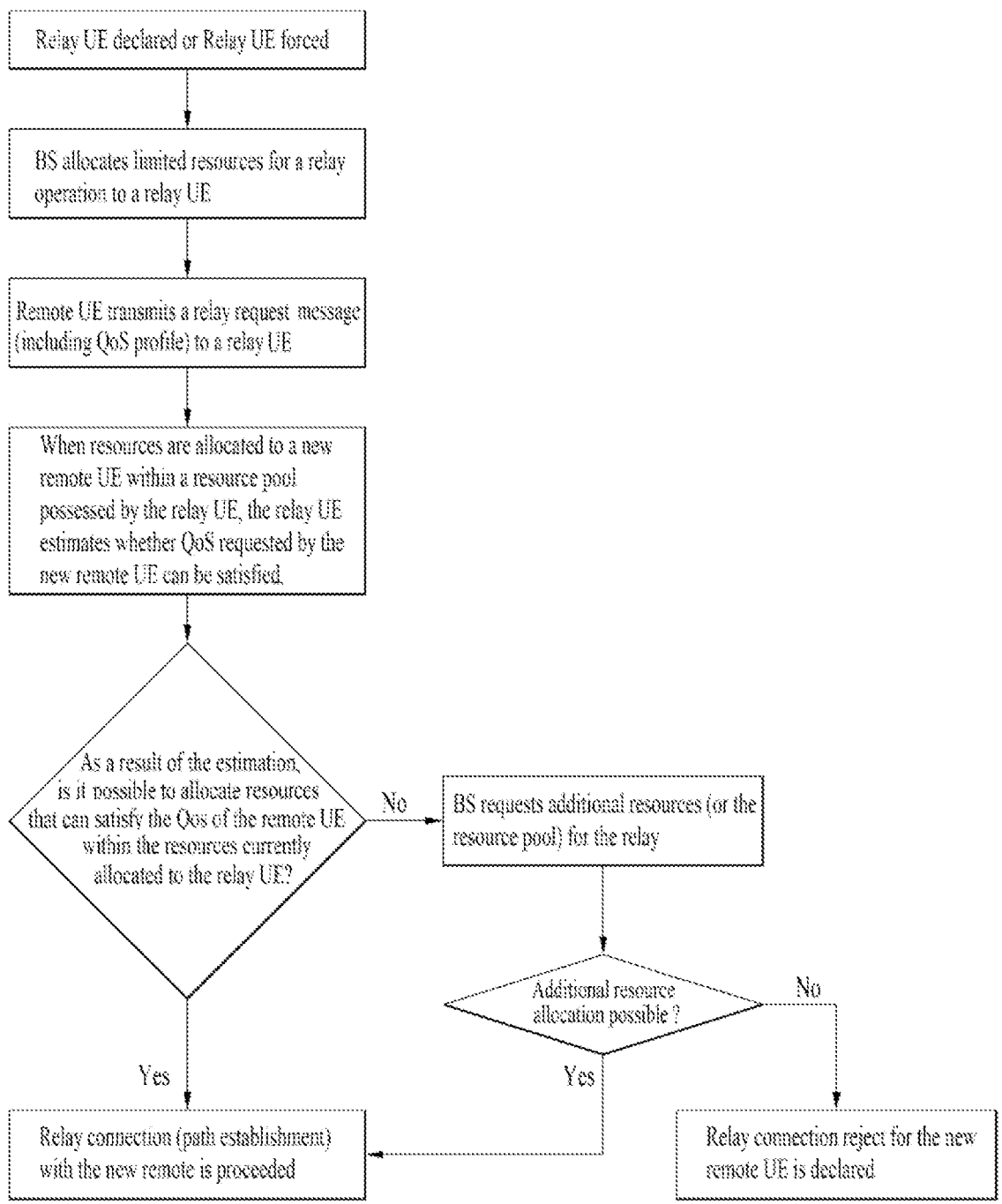

FIG. 12 is a flowchart illustrating an example of a method for performing admission control by the relay UE. Although not all of the above descriptions are illustrated in FIG. 12, the above-described examples may be applied together.

The flowchart of FIG. 12 may be summarized as follows.

The BS may allocate basic resources for the relaying operation to the relay UE, and the remote UE may transmit QoS information (e.g., PQI) of data to be transmitted through the relay to the relay UE. When the relay UE establishes a connection based on QoS information received from the remote UE, the relay UE may estimate whether or not QoS can be satisfied and may determine whether or not connection to the remote UE is possible based on the estimation result.

In the above description, the current resources (or the resource pool) where estimation is performed may be allocated by the BS. That is, the BS may allocate resources (or the resource pool) to be used for the relay operation either to a relay UE that was declared as a relay UE or to a relay UE that was forced to operate as a relay UE by the BS.

As another example, the resource allocation may be based on a default pool allocated from the BS. The default pool may be allocated for a relay operation regardless of a Buffer Status Report (BSR) of the relay UE. That is, the BS may allocate a default pool (or default relay resource pool) for the relay operation, and the relay UE may perform a relay-related operation based on the default pool, and as such examples thereof will be described below. The following description related to the default pool may be used together with the relay request acceptance-related embodiment. Alternatively, the following description related to the default poll may be used independently regardless of this situation.

Figure 13:
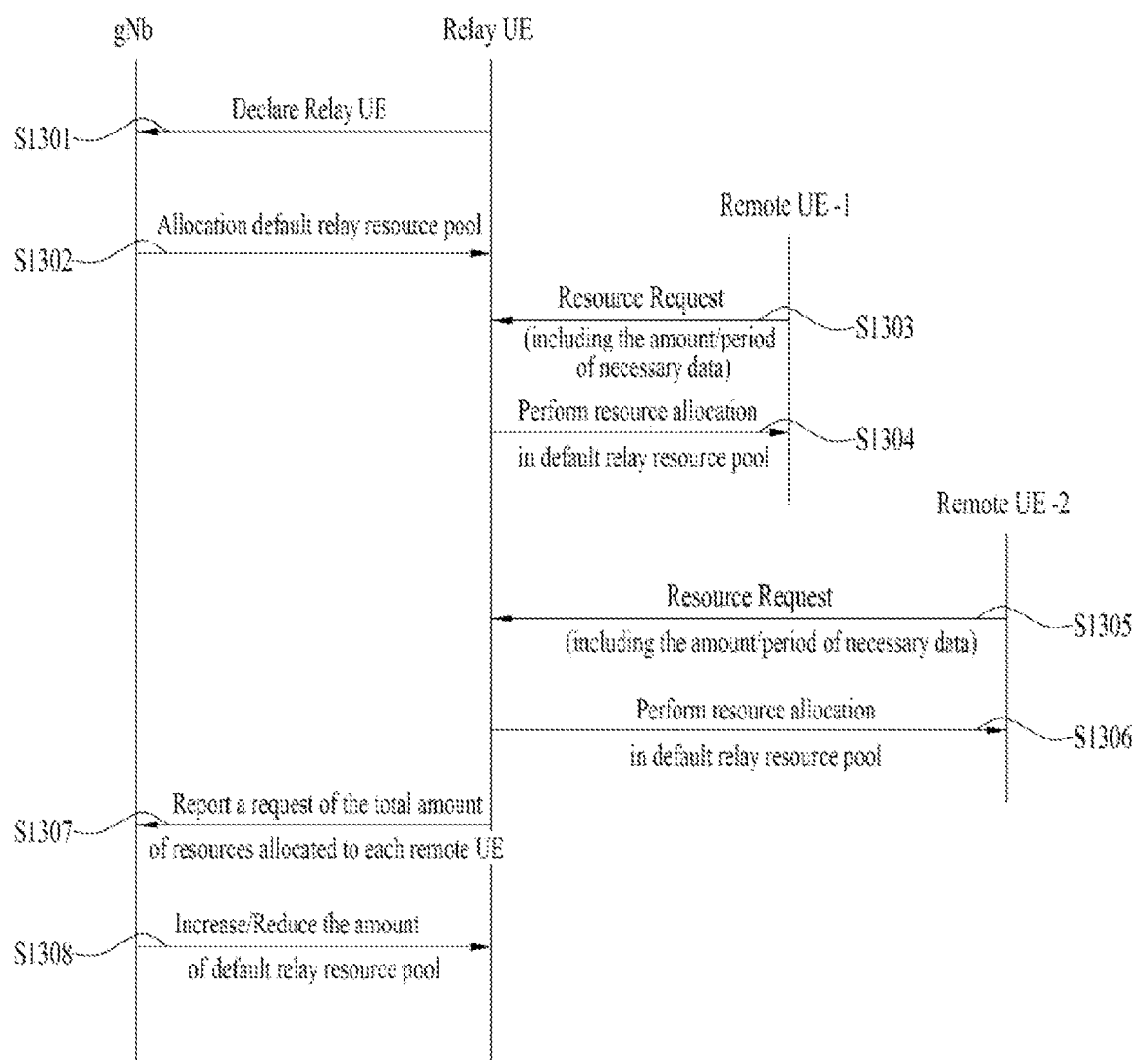

FIG. 13 illustrates a default pool and an example of a method for allocating resources to the remote UE based on this default pool. Referring to FIG. 13, the BS may allocate a "default relay resource pool" to the relay UE declared as a relay UE (S1301), or may allocate "default relay resource pool" to the relay UE forced by the BS (or the network) (S1302). In this case, the allocated default relay resource pool may be the resource pool having the same resources or the same size as those of all relay UEs. The default relay resource pool may be a resource used by the relay UE for sidelink communication for the purpose of relaying with the remote UE. The default relay resource pool may be a basic resource size value that will be allocated without receiving either the amount of data to be transmitted from the relay UE or the amount of necessary data (e.g., BSR). In addition, the size of allocated resources may vary depending on the channel busy ratio (CBR) situation. In addition, the size of allocated resources may be determined based on information received from a relay UE or a remote UE and/or based on information measured/received by the BS.

The relay UE having made PC5-S connection with the relay UE may report, to the relay UE, values corresponding to the amount/period (for example, MAC CE (e.g., BSR), RRC message (e.g., UEAssistanceInformation), etc.) of data to be transmitted through sidelink. The values corresponding to the amount/period of data to be transmitted may be included in the resource request transmitted from the remote UE to the relay UE. That is, the remote UE may transmit a resource request including the amount/period of required data to the relay UE (S1303 or S1305)

The relay UE may transmit resource information allocated in the default relay resource pool to the remote UE (S1304 or S1306). Specifically, the relay UE that has received the amount/period (for example, MAC CE (e.g., BSR), RRC message (e.g., UEAssistanceInformation), etc.) of data to be transmitted from the remote UE may allocate resources (e.g., CG/DG grant) to be used for data transmission to the remote UE within the default relay resource pool allocated from the BS.

The relay UE multiplexes all the resources (e.g., sidelink grants) allocated to the remote UE(s) or the resource amount/period value that will be used after being received from the remote UE, and reports the result of multiplexing to the BS (S1307). In this case, the method of reporting the result of multiplexing to the BS may be periodic or may be reported only when a special triggering condition occurs. The triggering condition may be a case in which more than a predetermined value (threshold) of the default relay resource pool received from the BS is used, or may refer to a case in which a difference between the previously reported content and the predetermined value is equal to or greater than the predetermined value.

The BS may determine whether to extend/reduce the default relay resource pool through a multiplexing value, for example, resources allocated to all remote UE(s) reported by the relay UE or the amount/period of necessary resources received from the remote UE. When it is determined that the default relay resource pool needs to be expanded/reduced, the BS may allocate additional resources to the relay UE by reflecting the result of determination or may transmit a control signal such as a signal for excluding a specific part from previously allocated resources (S1308).

Figure 14:
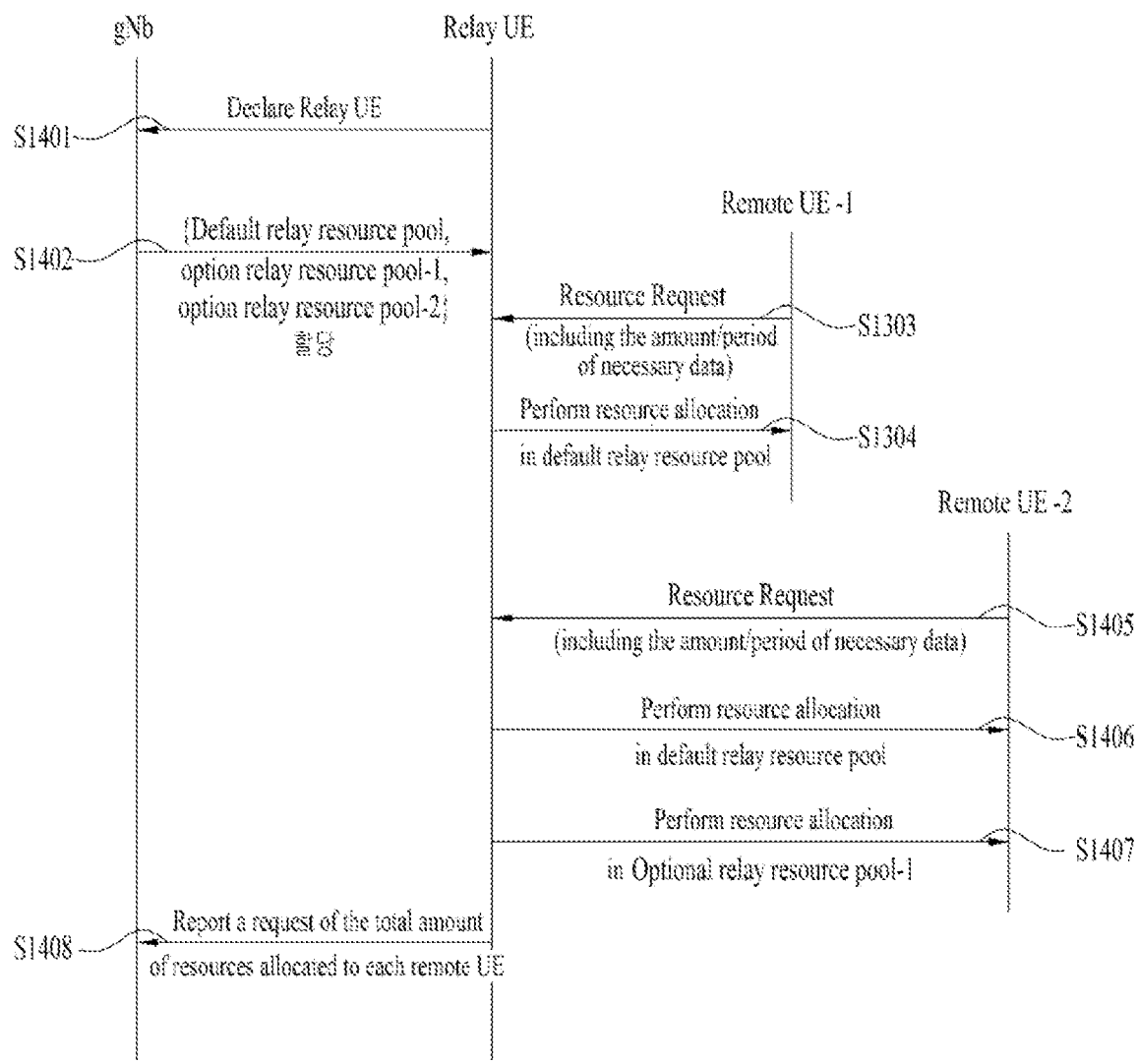

FIG. 14 illustrates a default pool and a method of allocating resources to a remote UE based on the default pool. Referring to FIG. 14, the BS may allocate "default relay resource pool" and "optional relay resource pool(s)" to the relay UE that was declared as a relay UE (S1401) or was forced by the BS (or network) (S1402). In this case, the allocated default relay resource pool may be the resource pool having the same resource or the same size as those of all relay nodes, and these resources may be used by the relay UE for sidelink communication for the purpose of relaying with the remote UE.

The default relay resource pool may be a basic resource size value that will be allocated without receiving either the amount of data to be transmitted from the relay UE or the amount of necessary data (e.g., BSR). In addition, the size of allocated resources may vary depending on the channel busy ratio (CBR) situation. The optional relay resource pool is a resource pool that is additionally allocated in addition to the default relay resource pool. This optional relay resource pool may be a pool of resources that can be additionally allocated according to either the capability (e.g., information as to how many remote UEs (sidelink/PC5-S link) can be served, the amount of residual power, etc.) of the relay UE or the channel environment (e.g., non-busy/busy state in the channel environment).

If the default resource pool is not shared with another relay UE and is a resource pool that is specifically configured for each relay UE (or for each relay UE group), the optional resource pool may also be a resource pool shared with other relay UEs. If resources are allocated using such optional resource pool, these resources may overlap a specific location to which another relay UE is allocated, so that these resources may also be referred to as resources having a lower quality than the default resource pool having the possibility of collision with others.

The relay UE and the PC5-S connected remote UE may transmit, to the relay UE, the value corresponding to the amount/period of data (for example, MAC CE (such as BSR), RRC message (such as UEAssistanceInformation)) to be transmitted through the sidelink (S1403 or S1405).

The relay UE having received the resource amount/period value to be transmitted from the remote UE may preferentially select resources from the default relay resource pool allocated from the BS, and may allocate, to the remote UE, the resources (e/g., CG/DG grant) to be used for data transmission (S1404 or S1406). If resources to be selected from the default relay resource pool are considered insufficient, necessary resources can be selected from the optional relay resource pool. The optional relay resource pool to be used for allocation may be divided into a plurality of relay pools (e.g., optional relay resource pool-1, optional relay resource pool-2, etc.) according to the priority or the degree of overlapping of resources allocated to another relay UE. Even when the relay UE allocates resources to the remote UE within the optional resource pool, resources are preferentially allocated within the optional resource pool-1, and additionally necessary resources may be allocated within the optional resource pool-2.

On the other hand, after the resource is selected from the default relay resource pool and is then allocated to the preferentially connected remote UE-1, if the optional relay resource pool having a relatively poor quality is allocated to the remote UE-2 that will be connected at a later time, the remote UE connected at a later time may always be in a losing position. Therefore, the default UE may allocate resources to the remote UE/data/logical channel (LCH) having a specific priority or higher, and the optional relay resource pool may be allocated to UE/LCH (logical channel)/data having a relatively lower priority.

The relay UE may report the area of the resource pool currently used (or the total amount of resources allocated to each remote UE) to the BS (S1408). The BS may allocate coordinated resources to multiple relay UEs by using the corresponding information. For example, the optional relay resource pool allocated to the relay UE 1 and the optional relay resource pool allocated to the adjacent relay UE 2 are allocated differently, thereby increasing the efficiency of resource usage.

In summary, the BS may allocate basic resources for the relaying operation to the relay UE. The remote UE may request SL resources for transmitting the generated data from the relay UE, and the relay UE may allocate the resource requested by the remote UE from the default resources received from the BS. The relay UE may report the amount of resources currently used by (several) remote UEs to the BS (by periodic/triggering conditions). The BS can reduce/extend the amount of resources allocated to the relay UE by reflecting the amount of resources that are being used by the remote UE that has received the report from the relay UE and then used for the relaying operation. Through the above-described configuration, the relay UE allocates resources for the remote UE, so that the relay UE can obtain lower latency and higher reliability than the other operation in which the BS directly allocates resources to be used by the relay UE.

Figure 15:
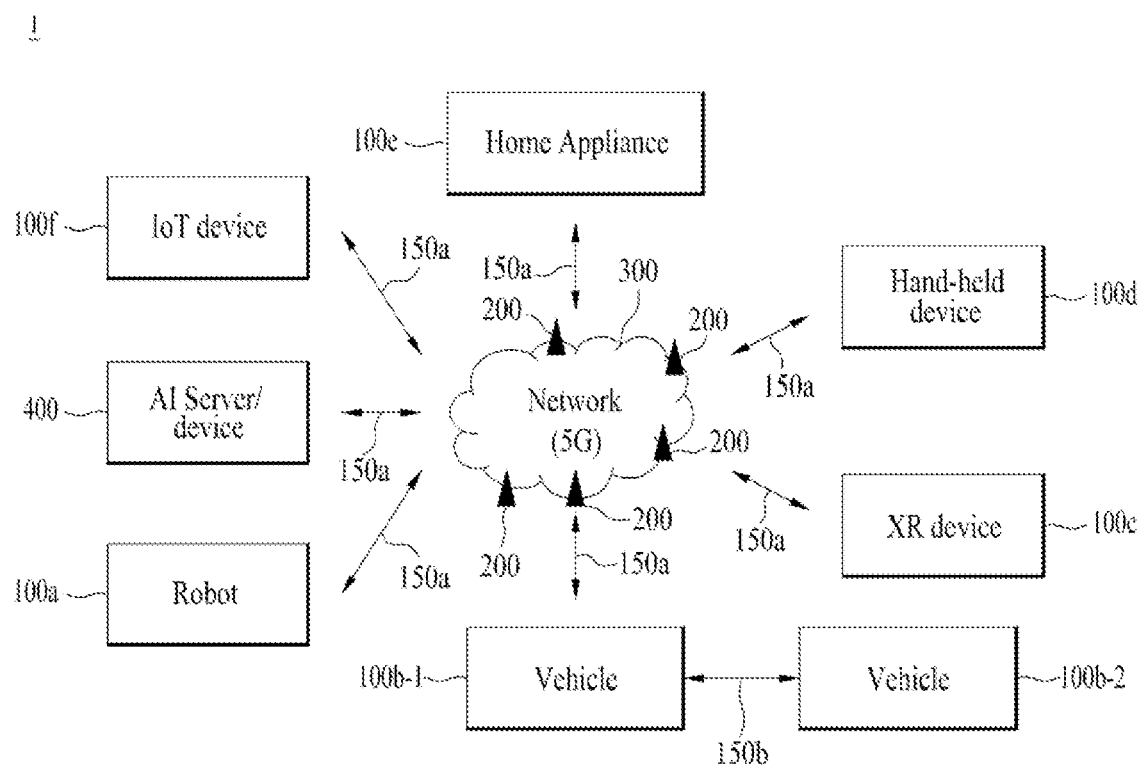
FIGS. 15 to 21 are block diagrams illustrating various devices to which embodiment(s) of the present disclosure are applicable.

In description of FIGS. 14 to 15, the signaling numbers do not necessarily mean the time order, and these orders may be changed as necessary.

On the other hand, the relay UE may include at least one processor; and at least one computer memory operatively connected to the at least one processor, and configured to store instructions such that the at least one processor performs specific operations by executing the instructions. The specific operations include receiving a relay request from a first remote UE, and determining whether to accept the relay request of the first remote UE. The relay request may include first QoS related information, and the relay UE may accept the relay request based on a situation in which resources satisfying the first QoS-related information can be allocated to the first remote UE.

In a processor for performing operations for a relay user equipment (UE), the operations may include: receiving a relay request from a first remote UE; and determining whether to accept the relay request of the first remote UE, wherein the relay request includes first QoS-related information, and the relay UE may accept the relay request based on a resource allocation satisfying the first QoS-related information to the first remote UE.

Further, in a non-volatile computer-readable storage medium storing at least one computer program including instructions that, when executed by at least one processor, cause the at least one processor to perform specific operations for a UE, the specific operations may include receiving a relay request from the first remote UE, and determining whether to accept the relay request of the first remote UE, wherein the relay request includes first QoS-related information, and the relay UE may accept the relay request based on a situation in which resources satisfying the first QoS-related information can be allocated to the first remote UE.
Examples of Communication Systems Applicable to the Present Disclosure The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 15 illustrates a communication system 1 applied to the present disclosure.

Referring to FIG. 15, a communication system 1 applied to the present disclosure includes wireless devices, BSs, and a network. Herein, the wireless devices represent devices performing communication using RAT (e.g., 5G NR or LTE) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. V2V/V2X communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as UL/DL communication 150a, sidelink communication 150b (or, D2D communication), or inter BS communication (e.g. relay, integrated access backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices Applicable to the Present Disclosure

Figure 16:
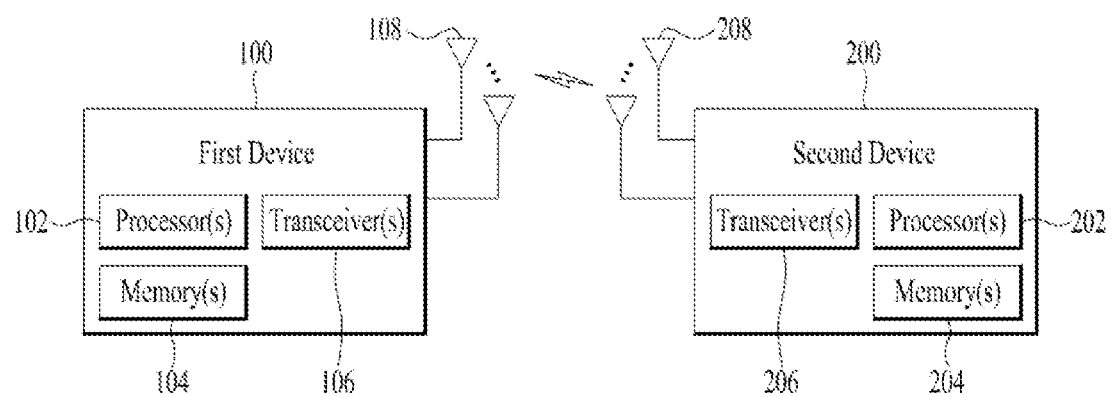

FIG. 16 illustrates wireless devices applicable to the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 17:
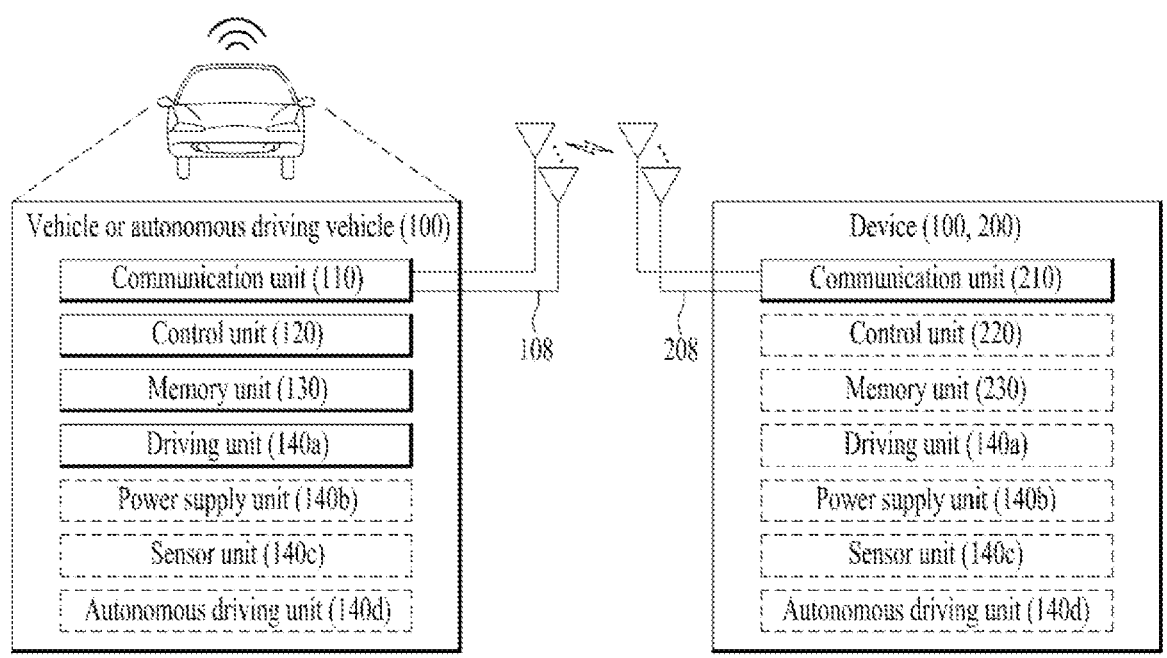

Examples of a vehicle or an autonomous driving vehicle applicable to the present disclosure FIG. 17 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 17, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of a Vehicle and AR/VR Applicable to the Present Disclosure

Figure 18:
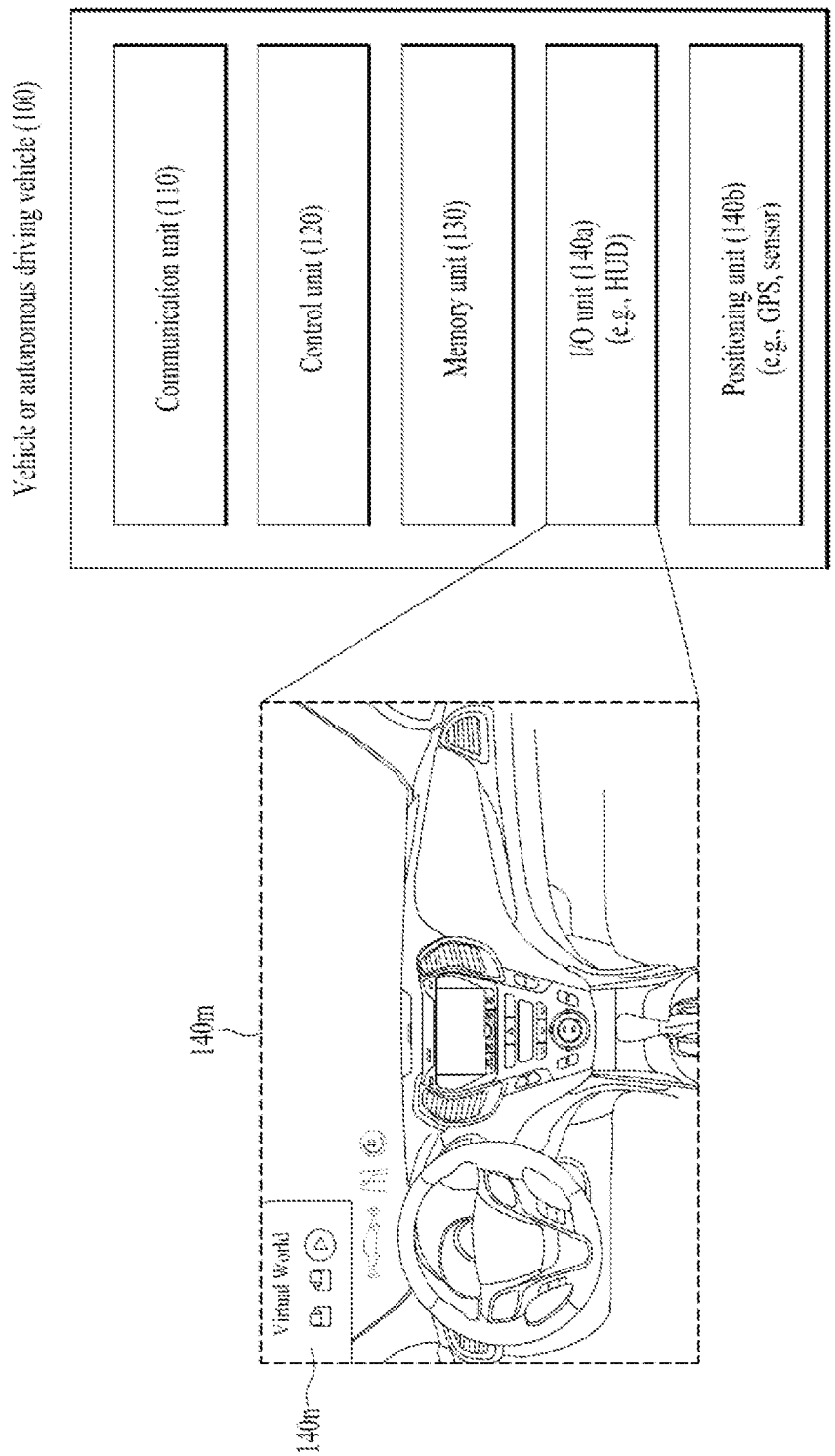

FIG. 18 illustrates a vehicle applied to the present disclosure. The vehicle may be implemented as a transport means, an aerial vehicle, a ship, etc.

Referring to FIG. 18, a vehicle 100 may include a communication unit 110, a control unit 120, a memory unit 130, an I/O unit 140a, and a positioning unit 140b.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Examples of an XR Device Applicable to the Present Disclosure

Figure 19:
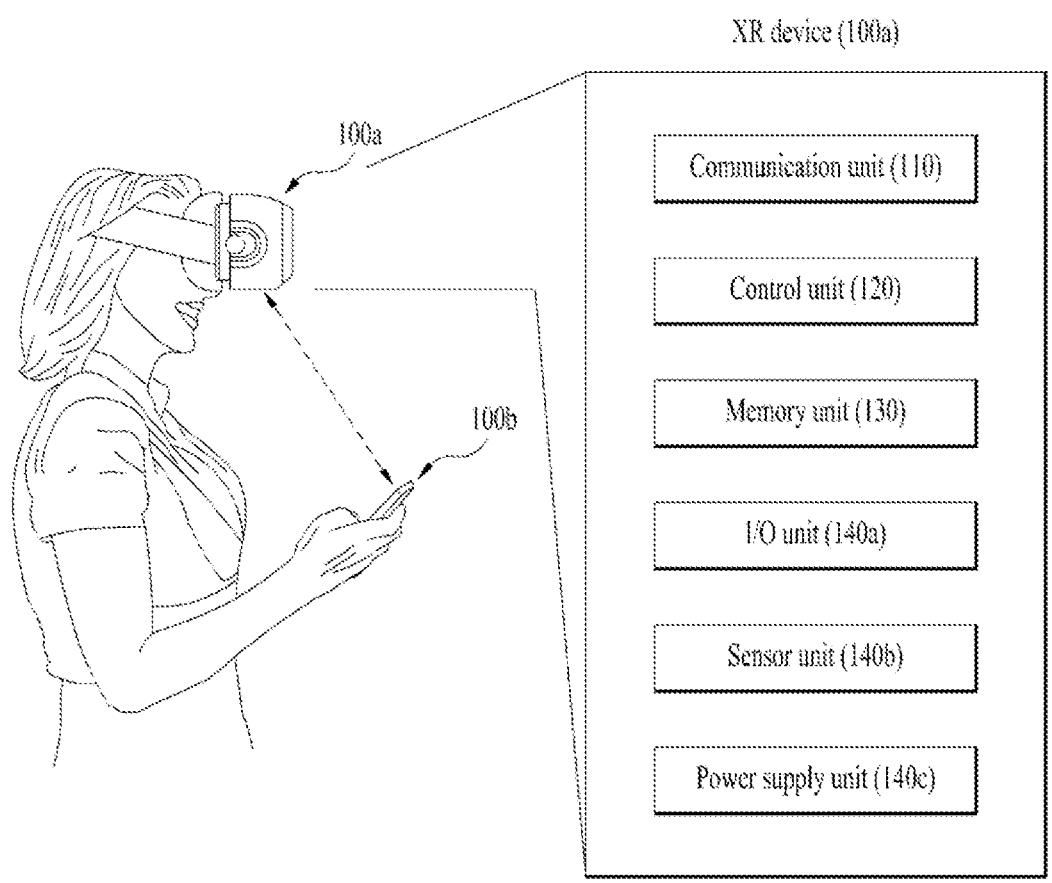

FIG. 19 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 19, an XR device 100a may include a communication unit 110, a control unit 120, a memory unit 130, an I/O unit 140a, a sensor unit 140b, and a power supply unit 140c.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100a. For example, the control unit 120 may be configured to control and/or perform procedures such as video/image acquisition, (video/image) encoding, and metadata generation and processing. The memory unit 130 may store data/parameters/programs/code/commands needed to drive the XR device 100a/generate XR object. The I/O unit 140a may obtain control information and data from the exterior and output the generated XR object. The I/O unit 140a may include a camera, a microphone, a user input unit, a display unit, a speaker, and/or a haptic module. The sensor unit 140b may obtain an XR device state, surrounding environment information, user information, etc. The sensor unit 140b may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140c may supply power to the XR device 100a and include a wired/wireless charging circuit, a battery, etc.

For example, the memory unit 130 of the XR device 100a may include information (e.g., data) needed to generate the XR object (e.g., an AR/VR/MR object). The I/O unit 140a may receive a command for manipulating the XR device 100a from a user and the control unit 120 may drive the XR device 100a according to a driving command of a user. For example, when a user desires to watch a film or news through the XR device 100a, the control unit 120 transmits content request information to another device (e.g., a hand-held device 100b) or a media server through the communication unit 130. The communication unit 130 may download/stream content such as films or news from another device (e.g., the hand-held device 100b) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140a/sensor unit 140b.

The XR device 100a may be wirelessly connected to the hand-held device 100b through the communication unit 110 and the operation of the XR device 100a may be controlled by the hand-held device 100b. For example, the hand-held device 100b may operate as a controller of the XR device 100a. To this end, the XR device 100a may obtain information about a 3D position of the hand-held device 100b and generate and output an XR object corresponding to the hand-held device 100b.

Examples of a Robot Applicable to the Present Disclosure

Figure 20:
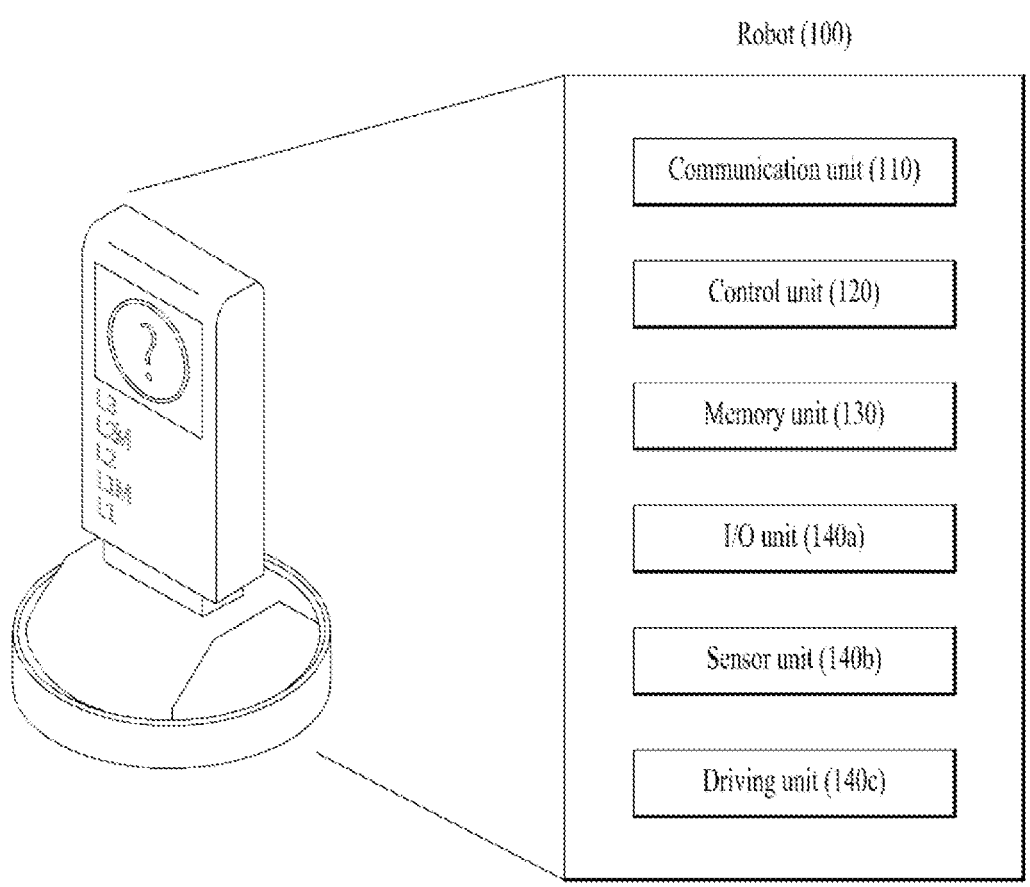

FIG. 20 illustrates a robot applied to the present disclosure. The robot may be categorized into an industrial robot, a medical robot, a household robot, a military robot, etc., according to a used purpose or field.

Referring to FIG. 20, a robot 100 may include a communication unit 110, a control unit 120, a memory unit 130, an I/O unit 140a, a sensor unit 140b, and a driving unit 140c.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140a may obtain information from the exterior of the robot 100 and output information to the exterior of the robot 100. The I/O unit 140a may include a camera, a microphone, a user input unit, a display unit, a speaker, and/or a haptic module. The sensor unit 140b may obtain internal information of the robot 100, surrounding environment information, user information, etc. The sensor unit 140b may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140c may perform various physical operations such as movement of robot joints. In addition, the driving unit 140c may cause the robot 100 to travel on the road or to fly. The driving unit 140c may include an actuator, a motor, a wheel, a brake, a propeller, etc.

Example of AI device to which the present disclosure is applied.

Figure 21:
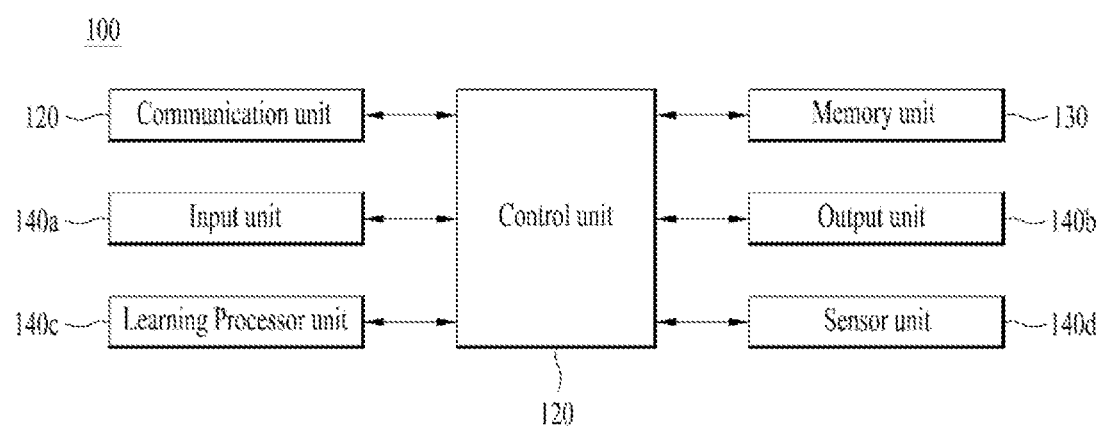

FIG. 21 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 21, an AI device 100 may include a communication unit 110, a control unit 120, a memory unit 130, an I/O unit 140a/140b, a learning processor unit 140c, and a sensor unit 140d.

The communication unit 110 may transmit and receive wired/radio signals (e.g., sensor information, user input, learning models, or control signals) to and from external devices such as other AI devices (e.g., 100x, 200, or 400 of FIG. 15) or an AI server (e.g., 400 of FIG. 15) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140c or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server (400 of FIG. 15). The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may acquire various types of data from the exterior of the AI device 100. For example, the input unit 140a may acquire learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 15). The learning processor unit 140c process information received from an external device through the communication unit 110 and/or information stored in the memory unit 130. In addition, an output value of the learning processor unit 140c may be transmitted to the external device through the communication unit 110 and may be stored in the memory unit 130.

The above-described embodiments of the present disclosure are applicable to various mobile communication systems.

What is claimed is:

1. A method for operating a relay user equipment (UE) related to a sidelink relay in a wireless communication system comprising:
   establishing, by the relay UE, a connection with a base station (BS);
   receiving, by the relay UE, a request related a sidelink relay from a first remote user equipment (UE); and
   establishing, by the relay UE, a connection with the first remote UE;
   wherein the request includes information related to a first quality of service (QOS), and
   wherein the relay UE accepts the request related to a sidelink relay based on a situation in which resource allocation satisfying the first QOS-related information is applicable to the first remote UE, and adjust QoS of other remote UEs to satisfy only a minimum QoS requirements,
   wherein the relay UE requests additional resources to the BS based on the minimum QoS requirements not being satisfied.

2. The method according to claim 1, wherein:
   the resource allocation is based on a default pool allocated from the BS.

3. The method according to claim 1, wherein:
   the relay UE rejects the request related to a sidelink relay based on a situation in which the first QoS-related information of the first remote UE not being satisfied.

4. The method according to claim 1, wherein:
   the relay UE rejects the request related to a sidelink relay based on failure to satisfy information related to a second QoS of a second remote UE in order to satisfy the first QoS-related information of the first remote UE.

5. The method according to claim 1, wherein:
   the relay UE transmits an additional resource allocation request to the BS based on failure to satisfy information related to a second QoS of a second remote UE in order to satisfy the first QoS-related information of the first remote UE.

6. The method according to claim 5, wherein:
   the relay UE defers acceptance of the request related to a sidelink relay until additional resources are allocated after occurrence of the additional resource allocation request.

7. The method according to claim 5, wherein:
   the relay UE accepts the request related to a sidelink relay after occurrence of the additional resource allocation request.

8. The method according to claim 1, wherein:
   the relay UE is configured to perform dropping of the second remote UE not only based on failure to satisfy information related to a second QoS of a second remote UE in order to satisfy the first QoS-related information of the first remote UE, but also based on a situation in which the first remote UE has a higher priority than the second remote UE.

9. The method according to claim 1, wherein:
   the first QOS-related information is a PC5 5G QOS Identifier (PQI).

10. The method according to claim 2, wherein:
    the default pool is allocated for a relay operation regardless of a buffer status report (BSR) of the relay UE.

11. A relay user equipment (UE) for use in a wireless communication system comprising:
    at least one processor; and
    at least one computer memory operatively connected to the at least one processor, and configured to store instructions such that the at least one processor performs specific operations by executing the instructions,
    wherein the specific operations include:
    establishing, by the relay UE, a connection with a base station;
    receiving a request related to a sidelink relay from a first remote UE; and
    establishing, by the relay UE, a connection with the first remote UE;
    wherein the request related to a sidelink relay includes first QoS-related information, and the relay UE accepts the request related to a sidelink relay based on a situation in which resource allocation satisfying the first QoS-related information is applicable to the first remote UE, and adjust QoS of other remote UEs to satisfy only minimum QoS requirements,
    wherein the relay UE requests additional resources to the BS based on the minimum Qos requirements being not satisfied.

* * * * *